United States Patent
Yu et al.

(10) Patent No.: US 12,207,324 B2
(45) Date of Patent: Jan. 21, 2025

(54) COMMUNICATION METHOD AND APPARATUS

(71) Applicant: HUAWEI TECHNOLOGIES CO., LTD., Guangdong (CN)

(72) Inventors: Youyang Yu, Shanghai (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 17/896,161

(22) Filed: Aug. 26, 2022

(65) Prior Publication Data

US 2022/0408502 A1    Dec. 22, 2022

Related U.S. Application Data

(63) Continuation of application No. PCT/CN2021/072918, filed on Jan. 20, 2021.

(30) Foreign Application Priority Data

Feb. 29, 2020   (CN) .......................... 202010131801.7

(51) Int. Cl.
  *H04W 76/11*    (2018.01)
  *H04L 61/5007*  (2022.01)
  *H04W 88/16*    (2009.01)

(52) U.S. Cl.
  CPC ......... *H04W 76/11* (2018.02); *H04L 61/5007* (2022.05); *H04W 88/16* (2013.01)

(58) Field of Classification Search
  CPC .... H04W 76/11; H04W 88/16; H04L 61/5007
  See application file for complete search history.

(56) References Cited

U.S. PATENT DOCUMENTS 10,750,553 B2 *  8/2020  Sankar ............... H04W 76/11
11,224,093 B2 *  1/2022  Bharatia ............. H04W 80/10
(Continued)

FOREIGN PATENT DOCUMENTS

CN    109314942 A    2/2019
CN    110169098 A    8/2019
(Continued)

OTHER PUBLICATIONS

Huawei et al., "New KI: Isolation of multiple NAS connections", 3GPP TSG SA WG3 (Security) Meeting #94 S3-190243, Jan. 28 Feb. 1, 2019, Kochi (India), total 3 pages.
(Continued)

*Primary Examiner* — Adam D Houston

(57) ABSTRACT

The technology of this application relates to a communication method and apparatus, to resolve a current problem that limited bandwidth resources of a single link affect quality of service. In an example embodiment, a terminal sends a first access message to an access gateway in a second core network through a first network, and sends a second access message to the access gateway through a second network, where the first access message is encapsulated by using a first IP address. Further, the access gateway requests an AMF network element to establish two communication links for the terminal. One communication link is for the terminal to access the core network through the first network, and the other communication link is for the terminal to access the core network through the second network. Through establishment of the two communication links between the terminal and the core network, bandwidth resources can be added, and the quality of service can be improved.

20 Claims, 13 Drawing Sheets

(56) References Cited

U.S. PATENT DOCUMENTS

| | | | |
|---|---|---|---|
| 11,290,974 B2* | 3/2022 | Yu | H04W 76/16 |
| 12,010,615 B2* | 6/2024 | Stojanovski | H04W 8/02 |
| 2011/0320580 A1* | 12/2011 | Zhou | H04L 12/14 |
| | | | 709/223 |
| 2019/0098536 A1* | 3/2019 | Qiao | H04W 36/0016 |
| 2020/0053802 A1* | 2/2020 | Li | H04W 12/06 |
| 2022/0408502 A1* | 12/2022 | Yu | H04W 76/11 |
| 2023/0069252 A1* | 3/2023 | Zhu | H04W 48/16 |

FOREIGN PATENT DOCUMENTS

| | | | | |
|---|---|---|---|---|
| EP | 3986007 A1 * | 4/2022 | | H04L 67/14 |
| EP | 4175255 A1 * | 5/2023 | | H04L 12/1407 |
| KR | 20230066112 A * | 5/2023 | | |
| WO | 2018158729 A1 | 9/2018 | | |
| WO | 2019196788 A1 | 10/2019 | | |
| WO | 2020036883 A1 | 2/2020 | | |
| WO | WO-2022022639 A1 * | 2/2022 | | H04L 67/141 |
| WO | WO-2023185880 A1 * | 10/2023 | | |

OTHER PUBLICATIONS

3GPP TS 22.263 V17.0.0 (Dec. 2019)3rd Generation Partnership Project; Technical Specification Group Technical Specification Group Services and System Aspects; Service requirements for video, imaging and audio for professional applications (VIAPA); Stage 1(Release 17), total 18 pages.

Samsung, "Non-3GPP Access: Correcting Connection Identifier", 3GPP TSG-SA3 Meeting #94 S3-190365, Kochi, India, Jan. 28 Feb. 1, 2019, total 4 pages.

3GPP TR 23.734 V16.2.0 (Jun. 2019) Technical Report3rd Generation Partnership Project; Technical Specification Group Services and System Aspects;Study on enhancement of 5G System (5GS) for vertical and Local Area Network (LAN) services(Release 16), total 117 pages.

International Search Report for Application No. PCT/CN2021/072918 dated Feb. 29, 2020, 20 pages.

LG Electronics et al., "TS 23.501: Description for initial registration", SA WG2 Meeting #121 S2-173994, May 15 -19, 2017, Hangzhou, China, 3 pages.

Extended European Search Report for Application No. 21761809.9 dated Jun. 16, 2023, 9 pages.

* cited by examiner

COMMUNICATION METHOD AND APPARATUS

CROSS-REFERENCE TO RELATED APPLICATIONS

This application is a continuation of International Application No. PCT/CN2021/072918, filed on Jan. 20, 2021, which claims priority to Chinese Patent Application No. 202010131801.7, filed on Feb. 29, 2020. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

In a current technology, a terminal may directly access a core network through a 3rd generation partnership project (3GPP) access network or a non-3GPP access network. If only one link is available between the terminal and the core network, when the terminal needs to transmit large-scale data, bandwidth resources provided by the single link are limited. Consequently, quality of service and user experience are affected.

SUMMARY

Embodiments of this application provide a communication method and apparatus, to resolve a current problem that limited bandwidth resources of a single link affect quality of service.

According to a first aspect, a communication method is provided. A terminal may obtain a first IP address allocated by a first network to the terminal. Then, the terminal may send a first access message to an access gateway through the first network, where the first access message is encapsulated by using the first IP address. Then, the terminal may further send a second access message to the access gateway through a second network, where the second access message may include at least one of the following: the first IP address or a first identifier of the terminal. The first network includes a first access network and a first core network, and the second network is a second access network; or the first network is a second access network, and the second network includes a first access network and a first core network.

The first access message and the second access message may be used by the terminal to request to access the access gateway.

The terminal may first access a second core network through the first network, and then access the second core network through the second network. When the terminal accesses the second core network through the second network, the second access message carries the first IP address allocated by the first network to the terminal, so that the access gateway determines, based on the first IP address, that the terminal requests to establish two communication links. Through establishment of the two communication links between the terminal and the second core network, bandwidth resources can be added, and quality of service can be improved.

In a possible implementation, the first identifier of the terminal may include a temporary identifier allocated by the second core network to the terminal and/or a permanent identifier of the terminal. The temporary identifier allocated by the second core network to the terminal is a temporary identifier allocated by the second core network to the terminal when the terminal accesses the second core network through the first network.

The first access message may also include the first identifier of the terminal. The first identifier of the terminal may be the permanent identifier of the terminal, and/or the temporary identifier obtained from the second core network previously (for example, last time when the terminal accesses the second core network).

When the terminal includes the permanent identifier or the temporary identifier of the terminal in both the first access message and the second access message, the access gateway may re-determine, based on the permanent identifier or the temporary identifier of the terminal, that the two access messages are sent by the same terminal, in other words, the terminal requests to establish two communication links.

In a possible implementation, the first access message may include an identifier of the first network, and the second access message may further include an identifier of the second network. If the network includes the first access network and the first core network, the identifier of the network in the access message is an identifier of the first core network. The identifier of the first core network includes at least one of a public land mobile network identifier (PLMN ID) or an non-public network (NPN) network identifier (NID).

The identifier of the first network or the identifier of the second network is used to identify a source network of a first request message, so that the second core network delivers different policies for different networks.

In a possible implementation, the second access message may further include an identifier of an access and mobility management function (AMF) network element in the second core network.

The second access message carries the identifier of the AMF network element that serves the terminal in the second core network, so that the access gateway may send request messages to the same AMF network element, to establish the two communication links.

According to a second aspect, a communication method is provided. An access gateway in a second core network may receive a first access message sent by a terminal through a first network, where the first access message may be encapsulated by using a first IP address allocated by the first network to the terminal. Then, the access gateway may further receive a second access message sent by the terminal through a second network, where the second access message includes at least one of the following: the first IP address or a first identifier of the terminal. The first network includes a first access network and a first core network, and the second network is a second access network; or the first network is a second access network, and the second network includes a first access network and a first core network.

The terminal may first access the second core network through the first network, and then access the second core network through the second network. When the terminal accesses the second core network through the second network, the second access message carries the first IP address allocated by the first network to the terminal, so that the access gateway determines, based on the first IP address, that the terminal requests to establish two communication links. Through establishment of the two communication links between the terminal and the second core network, bandwidth resources can be added, and quality of service can be improved.

In a possible implementation, the access gateway may further determine, based on the first IP address and/or the first identifier of the terminal, that the first access message and the second access message correspond to the terminal, in other words, the first access message and the second access message are sent by the same terminal.

In a possible implementation, the first identifier of the terminal may include a temporary identifier allocated by the second core network to the terminal and/or a permanent identifier of the terminal. The temporary identifier allocated by the second core network to the terminal is a temporary identifier allocated by the second core network to the terminal when the terminal accesses the second core network through the first network.

The first access message may also include the first identifier of the terminal. The first identifier of the terminal may be the permanent identifier of the terminal, and/or the temporary identifier obtained from the second core network previously (for example, last time when the terminal accesses the second core network).

When the terminal includes the permanent identifier or the temporary identifier of the terminal in both the first access message and the second access message, the access gateway may redetermine, based on the permanent identifier or the temporary identifier of the terminal, that the two access messages are sent by the same terminal, in other words, the terminal requests to establish two communication links.

In a possible implementation, the first access message may include an identifier of the first network, and the second access message may further include an identifier of the second network. If the network includes the first access network and the first core network, the identifier of the network in the access message is an identifier of the first core network. The identifier of the first core network includes at least one of a PLMN ID or an NPN network identifier (NID).

The identifier of the first network or the identifier of the second network is used to identify a source network of a first request message, so that the second core network delivers different policies for different networks.

In a possible implementation, the second access message may further include an identifier of an AMF network element in the second core network. The identifier of the AMF network element may be used to select the same AMF.

The second access message carries the identifier of the AMF network element that serves the terminal in the second core network, so that the access gateway may send first request messages to the same AMF network element, to establish the two communication links.

In a possible implementation, the access gateway may further send the first request messages to the AMF network element, where the first request message includes at least one of the following: a link identifier of a link between the terminal and the access gateway and a multi-link indication, or the multi-link indication is for indicating that a plurality of links exist between the terminal and the access gateway.

The access gateway sends two first request messages to the AMF network element, and includes the multi-link indication or a corresponding link identifier in each first request message, to indicate the AMF network element to establish the two communication links.

In a possible implementation, the link identifier of the link between the terminal and the access gateway is an IP address allocated by the first core network to the terminal or an IP address allocated by the second access network to the terminal.

When a link corresponding to the first request message is a link through which the terminal accesses the second core network through the first core network, the link identifier is the IP address allocated by the first core network to the terminal. When a link corresponding to the first request message is a link through which the terminal accesses the second core network through the second access network, the link identifier is the IP address allocated by the second access network to the terminal.

In a possible implementation, the first request message may further include at least one of the following: an access mode of the terminal, the identifier of first network, or the identifier of the second network, where an access mode of the terminal indicates an access technology of the terminal, or indicates that the terminal accesses the access gateway through the first core network.

Different links are identified by using different access modes and/or different network identifiers, so that a second core network device delivers different policies for the different links.

In a possible implementation, the access gateway may further receive response messages that are of the first request messages and that are sent by the AMF network element, where the response message of the first request message may include a link identifier, and the link identifier is for indicating a link that corresponds to the response message and that is between the terminal and the access gateway. Therefore, the access gateway may establish a user plane connection between the terminal and the access gateway based on the link identifier. A link identifier in a first request message may be the same as a link identifier in a corresponding response message.

The AMF network element sends a corresponding response message for each first request message. A link identifier in one response message is for indicating that the terminal accesses the second core network through the first core network, and a link identifier in the other response message is for indicating that the terminal accesses the second core network through the second access network.

In a possible implementation, the access gateway may further receive response messages that are of the first request messages and that are sent by the AMF network element, where the response message of the first request message may include terminal identification information. Therefore, the access gateway may associate the response messages with a context of the same terminal based on the terminal identification information.

Response messages of a plurality of first request messages include same terminal identification information, and the terminal identification information is extracted from the context of the terminal after the AMF network element determines the context of the terminal based on the first identifier of the terminal. In this case, the terminal identification information may also be referred to as an N2 terminal identifier. The N2 terminal identifier may be a terminal identifier used on an N2 interface. For example, the N2 terminal identifier may be a temporary identifier allocated by the AMF network element to the terminal on the N2 interface, for example, an N2 AMF UE ID; or may be a temporary identifier allocated by the access gateway to the terminal on the N2 interface, for example, an N2 N3IWF UE ID.

In a possible implementation, an access technology used by the terminal to access the first access network is a 3GPP access technology, and an access technology used by the terminal to access the second access network is a non-3GPP access technology; or an access technology used by the terminal to access the first access network is a non-3GPP access technology, and an access technology used by the terminal to access the second access network is a 3GPP access technology.

According to a third aspect, a communication method is provided. An AMF network element may receive first request messages sent by an access gateway of a second core network, where the first request message may include at least one of the following: a link identifier of a link between a terminal and the access gateway and a multi-link indication, or the multi-link indication is for indicating that a plurality of links exist between the terminal and the access gateway. Then, the AMF network element sends second request messages to a session management function (SMF) network element, where the second request message may include an access mode of the terminal, and the access mode of the terminal indicates an access technology of the terminal, or indicates that the terminal accesses the access gateway through a first core network.

The access gateway sends two first request messages to the AMF network element, and includes the multi-link indication or a corresponding link identifier in each first request message, to indicate the AMF network element to establish two communication links. Therefore, the AMF network element may determine two access modes of the terminal, to indicate the SMF network element to establish a plurality of links. Subsequently, the AMF network element may include the same link identifier in a reply message and send the reply message to the access gateway, so that the access gateway may apply, to a corresponding link, a parameter carried in the reply message.

In a possible implementation, the link identifier of the link between the terminal and the access gateway is an IP address allocated by the first core network to the terminal or an IP address allocated by a second access network to the terminal.

When a link corresponding to the first request message is a link through which the terminal accesses the second core network through the first core network, the link identifier is the IP address allocated by the first core network to the terminal. When a link corresponding to the first request message is a link through which the terminal accesses the second core network through the second access network, the link identifier is the IP address allocated by the second access network to the terminal.

In a possible implementation, the first request message may further include at least one of the following: the access mode of the terminal, an identifier of a first network, or an identifier of a second network, where the access mode of the terminal indicates the access technology of the terminal, or indicates that the terminal accesses the access gateway through the first core network. If the network includes a first access network and the first core network, the identifier of the network in the access message is an identifier of the first core network. The identifier of the first core network includes at least one of a PLMN ID or an NPN network identifier (NID).

Alternatively, the AMF network element may determine, based on an access mode of the terminal that is reported by the access gateway, the access mode of the terminal that is carried in the second request message sent by the AMF network element to the SMF network element. The access gateway may identify different links by using different access modes of the terminal and/or different network identifiers, so that a second core network device delivers different policies for the different links.

In a possible implementation, the second request message may further include: a first multi-link indication, the identifier of the first network, or the identifier of the second network.

The first multi-link indication is for indicating that a plurality of links exist between the terminal and the access gateway of the second core network in which the SMF network element is located.

The AMF network element indicates, by using the multi-link indication, to establish a plurality of links, or identifies different links by using the identifier of the first network or the identifier of the second network, so that the SMF network element delivers different policies for the different links.

In a possible implementation, the AMF network element may further receive response messages that are of the second request messages and that are sent by the SMF network element, where the response message of the second request message may include the access mode of the terminal. Then, the AMF network element determines a link identifier of a link between the terminal and the access gateway based on the access mode of the terminal.

The SMF network element identifies different links by using different access modes of the terminal, to notify the AMF network element of a plurality of established links.

In a possible implementation, the AMF network element may further send response messages of the first request messages to the access gateway, where the response message of the first request message may include the link identifier, and the link identifier is for indicating a link that corresponds to the response message and that is between the terminal and the access gateway.

The AMF network element sends a corresponding response message for each first request message. A link identifier in one response message is for indicating that the terminal accesses the second core network through the first core network, and a link identifier in the other response message is for indicating that the terminal accesses the second core network through the second access network.

In a possible implementation, the AMF network element may further send response messages of the first request messages to the access gateway, where the response message of the first request message may include terminal identification information, and the terminal identification information is extracted from a context of the terminal after the AMF network element determines the context of the terminal based on a first identifier of the terminal.

Response messages of a plurality of first request messages include same terminal identification information, and the terminal identification information may be extracted from the context of the terminal after the AMF network element determines the context of the terminal based on the first identifier of the terminal. In this case, the terminal identification information may also be referred to as an N2 terminal identifier. The N2 terminal identifier may be a terminal identifier used on an N2 interface. For example, the N2 terminal identifier may be a temporary identifier allocated by the AMF network element to the terminal on the N2 interface, for example, an N2 AMF UE ID; or may be a temporary identifier allocated by the access gateway to the terminal on the N2 interface, for example, an N2 N3IWF UE ID.

According to a fourth aspect, a communication method is provided. An SMF network element may receive second request messages sent by an AMF network element, where the second request message may include an access mode of a terminal. An access mode of the terminal indicates an access technology of the terminal, or indicates that the terminal accesses an access gateway through a first core network. Then, the SMF may indicate a user plane function (UPF) network element to establish a plurality of user plane tunnels.

The AMF network element indicates, by using a plurality of access modes of the terminal, the SMF network element to establish a plurality of links. Therefore, the SMF network element indicates the UPF network element to establish the plurality of user plane tunnels. In addition, the AMF network element identifies different links by using different access modes, so that the SMF network element delivers different policies for the different links.

In a possible implementation, the second request message may further include: a first multi-link indication, an identifier of a first network, or an identifier of a second network.

The first multi-link indication is for indicating that a plurality of links exist between the terminal and the access gateway of a second core network in which the SMF network element is located.

The AMF network element indicates, by using the multi-link indication, to establish a plurality of links, or identifies different links by using the identifier of the first network or the identifier of the second network, so that the SMF network element delivers different policies for the different links.

In a possible implementation, the SMF network element may send response messages of the second request messages to the AMF network element, where the response message of the second request message includes the access mode of the terminal.

The SMF network element sends a corresponding response message for each second request message. An access mode of the terminal in one response message is for indicating that the terminal accesses the second core network through the first core network, and an access mode of the terminal in the other response message is for indicating that the terminal accesses the second core network through a second access network. The SMF network element identifies different links by using different access modes of the terminal, to notify the AMF network element of a plurality of established links.

For technical effects of any one of the fifth aspect to the tenth aspect and the possible implementations of the fifth aspect to the tenth aspect, refer to the first aspect, the second aspect, the third aspect, the fourth aspect, and the corresponding possible implementations.

According to a fifth aspect, a communication apparatus is provided. The communication apparatus has a function of implementing any one of the first aspect and the possible implementations of the first aspect, a function of implementing any one of the second aspect and the possible implementations of the second aspect, a function of implementing any one of the third aspect and the possible implementations of the third aspect, or a function of implementing any one of the fourth aspect and the possible implementations of the fourth aspect. The function may be implemented by hardware, or may be implemented by hardware by executing corresponding software. The hardware or software includes one or more function modules corresponding to the foregoing function.

According to a sixth aspect, a communication apparatus is provided. The apparatus may be the terminal in any one of the first aspect and the possible implementations of the first aspect, or a chip disposed in the terminal. Alternatively, the apparatus is the access gateway in any one of the second aspect and the possible implementations of the second aspect, or a chip disposed in the access gateway. Alternatively, the apparatus is the AMF network element in any one of the third aspect and the possible implementations of the third aspect, or a chip disposed in the AMF network element. Alternatively, the apparatus is the SMF network element in any one of the fourth aspect and the possible implementations of the fourth aspect, or a chip disposed in the SMF network element. The apparatus includes a transceiver and a processor, and in a possible implementation, further includes a memory. The memory is configured to store a computer program or instructions. The processor is coupled to the memory and the transceiver. When the processor executes the computer program or the instructions, the apparatus is enabled to perform, through the transceiver, the method performed by the terminal in any one of the first aspect and the possible implementations of the first aspect, the method performed by the access gateway in any one of the second aspect and the possible implementations of the second aspect, the method performed by the AMF network element in any one of the third aspect and the possible implementations of the third aspect, or the method performed by the SMF network element in any one of the fourth aspect and the possible implementations of the fourth aspect.

According to a seventh aspect, a computer program product is provided. The computer program product includes computer program code. When the computer program code is run on a computer, the computer is enabled to perform the method performed by the terminal in any one of the first aspect and the possible implementations of the first aspect, the method performed by the access gateway in any one of the second aspect and the possible implementations of the second aspect, the method performed by the AMF network element in any one of the third aspect and the possible implementations of the third aspect, or the method performed by the SMF network element in any one of the fourth aspect and the possible implementations of the fourth aspect.

According to an eighth aspect, this application provides a chip system. The chip system includes a processor and a memory. The processor and the memory are electrically coupled. The memory is configured to store computer program instructions. The processor is configured to: execute some or all of the computer program instructions in the memory, and implement, when the some or all of the computer program instructions are executed, a function of the terminal in the method according to any one of the first aspect and the possible implementations of the first aspect, a function of the access gateway in the method according to any one of the second aspect and the possible implementations of the second aspect, a function of the AMF network element in the method according to any one of the third aspect and the possible implementations of the third aspect, or a function of the SMF network element in the method according to any one of the fourth aspect and the possible implementations of the fourth aspect.

In a possible design, the chip system may further include a transceiver. The transceiver is configured to send a signal processed by the processor, or receive a signal input to the processor. The chip system may include a chip, or may include a chip and another discrete component.

According to a ninth aspect, a computer-readable storage medium is provided. The computer-readable storage medium stores a computer program. When the computer program is run, the method performed by the terminal in any one of the first aspect and the possible implementations of the first aspect, the method performed by the access gateway in any one of the second aspect and the possible implementations of the second aspect, the method performed by the AMF network element in any one of the third aspect and the possible implementations of the third aspect, or the method performed by the SMF network element in any one of the fourth aspect and the possible implementations of the fourth aspect is performed.

According to a tenth aspect, a communication system is provided. The system includes the access gateway that performs the method according to any one of the second aspect and the possible implementations of the second aspect, and the AMF network element that performs the method according to any one of the third aspect and the possible implementations of the third aspect. The system may further include the SMF network element that performs the method according to any one of the fourth aspect and the possible implementations of the fourth aspect.

BRIEF DESCRIPTION OF DRAWINGS

FIG. 5a, FIG. 5b-1 and FIG. 5b-2, and FIG. 6a and FIG. 6b show example communication methods for establishing a plurality of links according to embodiments of this application;

DETAILED DESCRIPTION OF EMBODIMENTS

The following describes in detail embodiments of this application with reference to the accompanying drawings.

Technical solutions in embodiments of this application may be applied to various communication systems, for example, a long term evolution (LTE) system, a worldwide interoperability for microwave access (WiMAX) communication system, a 5th generation (5G) system such as a new radio (NR) access technology system, and a future communication system.

In this application, the 5G communication system is used as an example for description.

Figure 1:
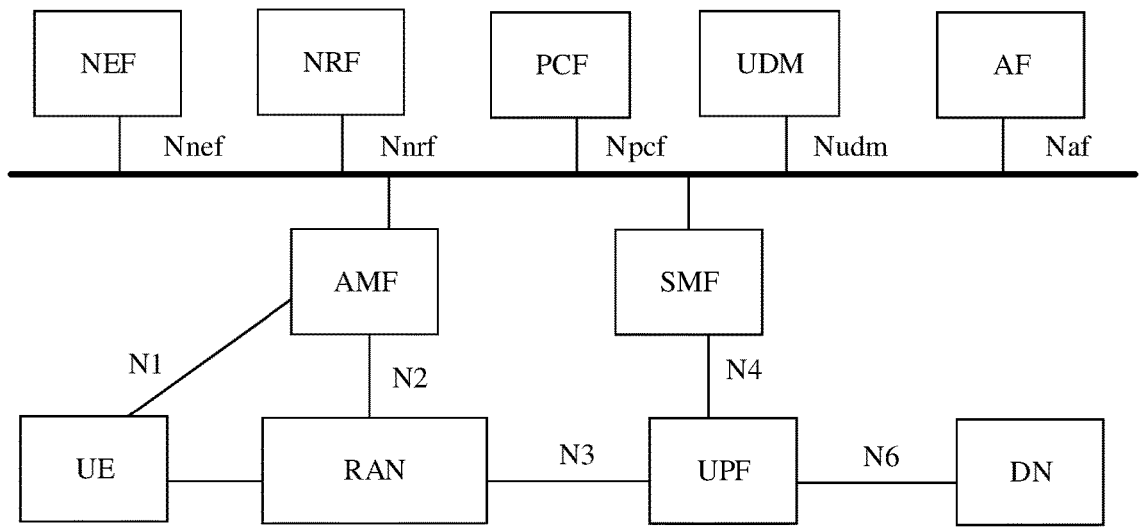
FIG. 1 is an example schematic diagram of an architecture of a 5G communication system according to an embodiment of this application.

For example, FIG. 1 is a schematic diagram of an architecture of a 5G communication system to which this application is applicable. Specifically, FIG. 1 is a schematic diagram of a 5G network architecture based on a service-oriented architecture. The 5G network architecture shown in FIG. 1 may include a terminal device part, an access network part, a core network part, a data network (DN) part, and an application function (AF) network element part. A terminal accesses a core network through an access network, and the core network communicates with a DN or an AR The following briefly describes functions of some network elements.

The core network part may include one or more of the following network elements: a network exposure function (NEF) network element, a network repository function (NRF) network element, a policy control function (PCF) network element, a unified data management (UDM) network element, an access and mobility management function (AMF) network element, a session management function (SMF) network element, a radio access network (RAN) device, a user plane function (UPF) network element, and the like.

A terminal device, which may also be referred to as user equipment (UE), is a device that has a wireless transceiver function. The terminal device may be deployed on land, where the deployment includes indoor or outdoor, or handheld or vehicle-mounted deployment; may be deployed on water (for example, on a ship); or may be deployed in air (for example, on an airplane, a balloon, and a satellite). The terminal device may be a mobile phone, a tablet computer (e.g., pad), a computer that has the wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, and the like.

A RAN device in this application is a device that provides a wireless communication function for a terminal device, and the RAN device is also referred to as an access network device. The RAN device in this application includes but is not limited to: a next generation base station (gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission reception point (TRP), a transmission point (TP), a mobile switching center, and the like.

An access management network element is a control plane network element provided by an operator network, and is responsible for access control and mobility management for accessing the operator network by a terminal device, for example, including functions such as mobility status management, allocation of a temporary user identity, and user authentication and authorization. In the 5G communication system, the access management network element may be the access and mobility management function (AMF) network element. In the future communication system, the access management network element may still be the AMF network element, or may have another name. This is not limited in this application.

A session management network element is mainly responsible for session management in a mobile network, for example, session establishment, modification, and release. For example, specific functions are allocation of an IP address to a user and selection of a UPF that provides a packet forwarding function. In the 5G communication system, the session management network element may be the session management function (SMF) network element. In the future communication system, the session management network element may still be the SMF network element, or may have another name. This is not limited in this application.

A user plane network element is responsible for forwarding and reception of user data in a terminal device. The user plane network element may receive user data from a data network, and transmit the user data to the terminal device through an access network device. In addition, the UPF network element may receive user data from the terminal device through the access network device, and forward the user data to the data network. A transmission resource and a scheduling function in the UPF network element that provide a service for the terminal device are managed and controlled by an SMF network element. In the 5G communication system, the user plane network element may be the user plane function (UPF) network element. In the future communication system, the user plane network element may still be the UPF network element, or may have another name. This is not limited in this application.

A data management network element is configured to generate an authentication credential, process a user identifier (for example, store and manage a permanent user identity), control access authorization, manage subscription data, and so on. In the 5G communication system, the data management network element may be the unified data management (UDM) network element. In the future communication system, the data management network element may still be the UDM network element, or may have another name. This is not limited in this application.

An application network element mainly supports interaction with a 3rd generation partnership project (3GPP) core network to provide services, for example, affect a data routing decision, provide a policy control function, or provide some third-party services for a network side. In the 5G communication system, the application network element may be the application function (AF) network element. In the future communication system, the application network element may still be the AF network element, or may have another name. This is not limited in this application.

A policy control network element mainly supports providing a unified policy framework to control network behavior and providing a policy rule for a control layer network function, and is responsible for obtaining user subscription information related to a policy decision. In a 4G communication system, the policy control network element may be a policy and charging rules function (PCRF) network element. In the 5G communication system, the policy control network element may be the policy control function (PCF) network element. In the future communication system, the policy control network element may still be the PCF network element, or may have another name. This is not limited in this application.

A network repository network element may be configured to provide a network element discovery function and provide, based on a request from another network element, network element information corresponding to a network element type. The NRF further provides a network element management service, for example, registration, update, and deregistration of a network element and subscription and push of a network element status. In the 5G communication system, the network repository network element may be the network repository function (NRF) network element. In the future communication system, the network repository network element may still be the NRF network element, or may have another name. This is not limited in this application.

A network exposure function network element may be configured to securely expose, to the outside, a service, a capability, and the like that are provided by a 3GPP network function device. In the 5G communication system, the network exposure function network element may be the network exposure function (NEF) network element. In the future communication system, the network exposure function network element may still be the NEF network element, or may have another name. This is not limited in this application.

A DN may deploy a plurality of services, and may provide a terminal device with services such as a data service and/or a voice service. For example, the DN is a private network of a smart factory, a sensor installed in a workshop of the smart factory may be a terminal device, a control server of the sensor is deployed in the DN, and the control server may provide a service for the sensor. The sensor may communicate with the control server, to obtain instructions of the control server, transmit collected sensor data to the control server based on the instructions, and so on. For another example, the DN is an internal office network of a company, a mobile phone or a computer of an employee of the company may be a terminal device, and the mobile phone or the computer of the employee may access information, data resources, and the like on the internal office network of the company.

In FIG. 1, Nnef, Nnrf, Npcf, Nudm, Naf, Namf, Nsmf, N1, N2, N3, N4, and N6 are interface sequence numbers. For meanings of these interface sequence numbers, refer to definitions in a 3GPP standard protocol. This is not limited herein.

It may be understood that the network elements or the functions may be network elements in a hardware device, may be software functions running on dedicated hardware, or may be virtualized functions instantiated on a platform (for example, a cloud platform). In a possible implementation, the network elements or the functions may be implemented by one device, may be jointly implemented by a plurality of devices, or may be one function module in one device. This is not specifically limited in embodiments of this application.

It should be understood that the foregoing network architecture applied to embodiments of this application is merely a network architecture that is described from a perspective of a service-oriented architecture and that is used as an example. A network architecture applicable to embodiments of this application is not limited thereto. Any network architecture that can implement functions of the foregoing devices is applicable to embodiments of this application.

The foregoing network architecture may support an access technology defined in a 3GPP standard, or may support a non-3GPP access technology. The access technology defined in the 3GPP standard is, for example, a next generation base station (gNB) technology or an evolved NodeB (eNB) long term evolution (LTE) technology. The non-3GPP access technology is, for example, WLAN, high rate packet data (HRPD), evolved high rate packet data (EHRPD), or worldwide interoperability for microwave access (WiMAX).

Figure 2:
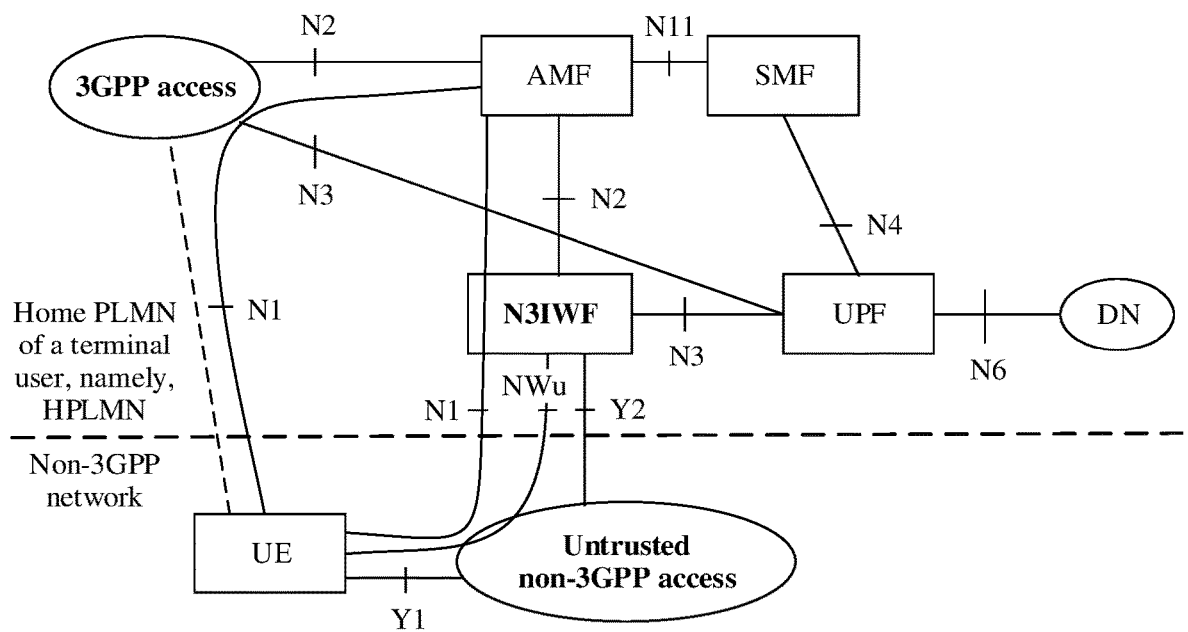
FIG. 2 is an example schematic diagram in which a terminal accesses a core network through an untrusted non-3GPP access network according to an embodiment of this application.

As shown in FIG. 2, a terminal accesses a core network through an untrusted non-3GPP access network. The untrusted non-3GPP access network may be, for example, an untrusted WLAN network. It should be noted that FIG. 2 shows only several network elements: an AMF, an SMF, and a UPF, and other network elements are omitted. This does not mean that an N3IWF does not interact with other network elements. In addition, the core network may further support access through a trusted non-3GPP access network and/or a fixed access network. The trusted non-3GPP access network includes a trusted WLAN network, and the fixed access network includes a fixed home network and the like. A network architecture is similar to an architecture shown in FIG. 2 in which the core network is accessed through the untrusted non-3GPP access network. Specifically, the untrusted non-3GPP access network and the non-3GPP interworking function (N3IWF) in FIG. 2 may be replaced with a trusted WLAN access gateway or a fixed access gateway, or the N3IWF may be replaced with a trusted access gateway. Access network devices between the terminal and the access gateway N3IWF include a WLAN AP, a fixed access network (FAN) device, a switch, a router, and the like. Regardless of trusted non-3GPP access, untrusted non-3GPP access, or fixed network access, a point-to-point interface protocol structure shown in FIG. 2 may be used on a core network side, or a service-oriented interface architecture that is consistent with the architecture shown in FIG. 1 in which the core network is accessed through a 3GPP access network may be used.

Figure 3A:
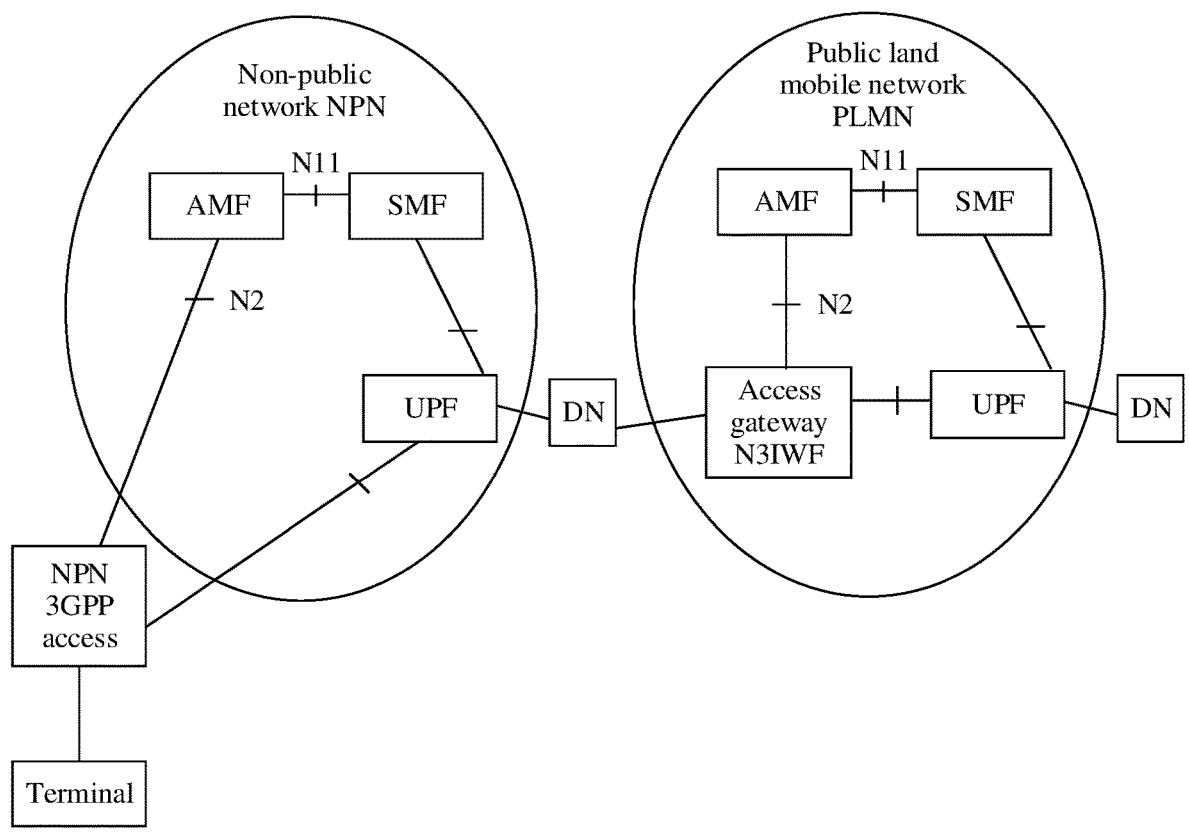
FIG. 3A and FIG. 3B are example schematic diagrams in which terminals access core networks through other core networks according to embodiments of this application.
Figure 3B:
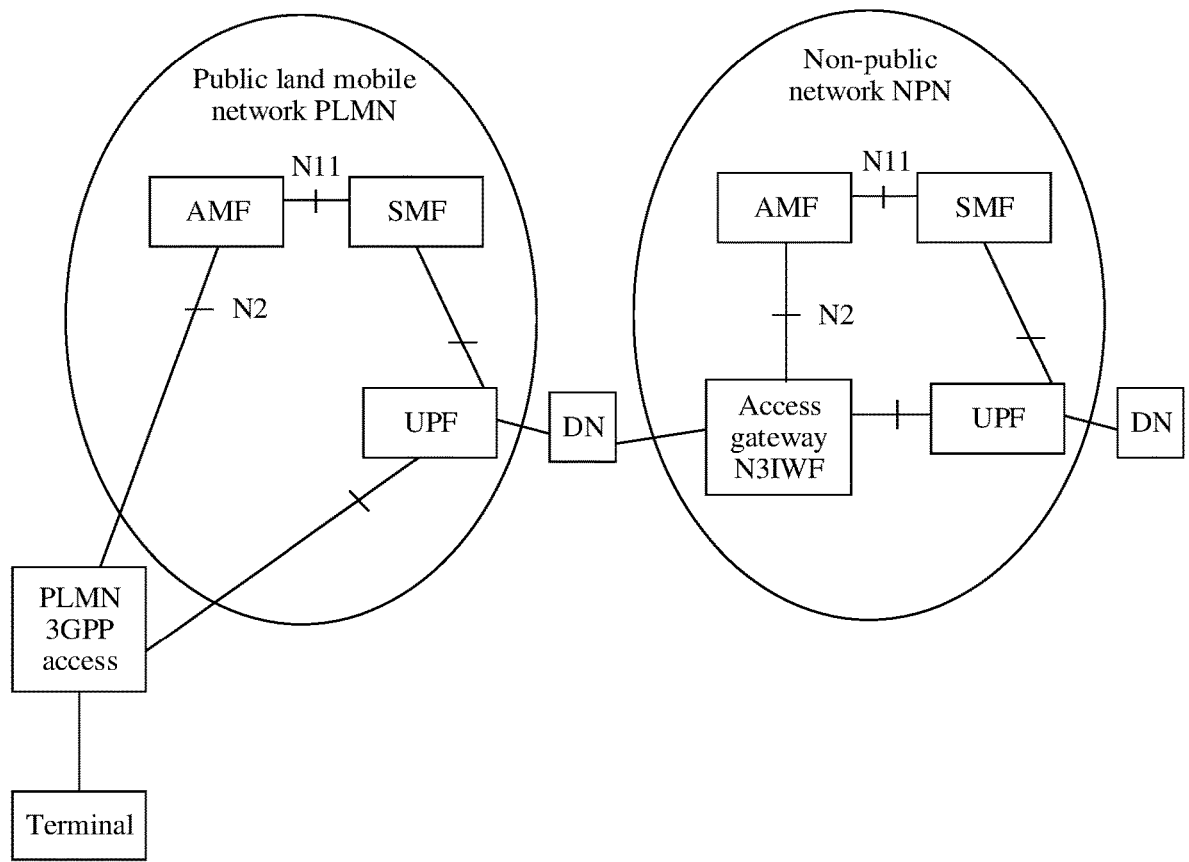

Based on the 3GPP access architecture or the non-3GPP access architecture described above, a terminal may directly access a core network through a 3GPP access network or a non-3GPP access network. FIG. 3A and FIG. 3B provide examples in which core networks are accessed through other core networks. The core network is, for example, a public land mobile network (PLMN) or a non-public network (NPN). The PLMN network is a public network that can be accessed by any legal terminal device. The NPN network and the PLMN network have a same network structure, in other words, have same logical function network elements. However, the NPN network allows access of only a specific terminal. For example, to help employees to access internal enterprise resources, an enterprise campus establishes a private NPN network that allows only the employees to access. For another example, a stadium or club establishes an NPN network to provide services for guests.

FIG. 3A shows an architecture of interaction between an NPN and a PLMN. UE accesses the NPN network through a 3GPP access network, and then accesses the PLMN network through the NPN network. FIG. 3B shows another architecture of interaction between an NPN and a PLMN. UE accesses the PLMN network through a 3GPP network, and then accesses the NPN through the PLMN network.

In a current technology, a terminal may directly access a core network through a 3GPP access network or a non-3GPP access network. Alternatively, the terminal may access a core network through another core network, as shown in FIG. 3A or FIG. 3B. When the terminal needs to transmit large-scale data, bandwidth resources provided by a single link are limited. Consequently, quality of service and user experience are affected.

Figure 3C:
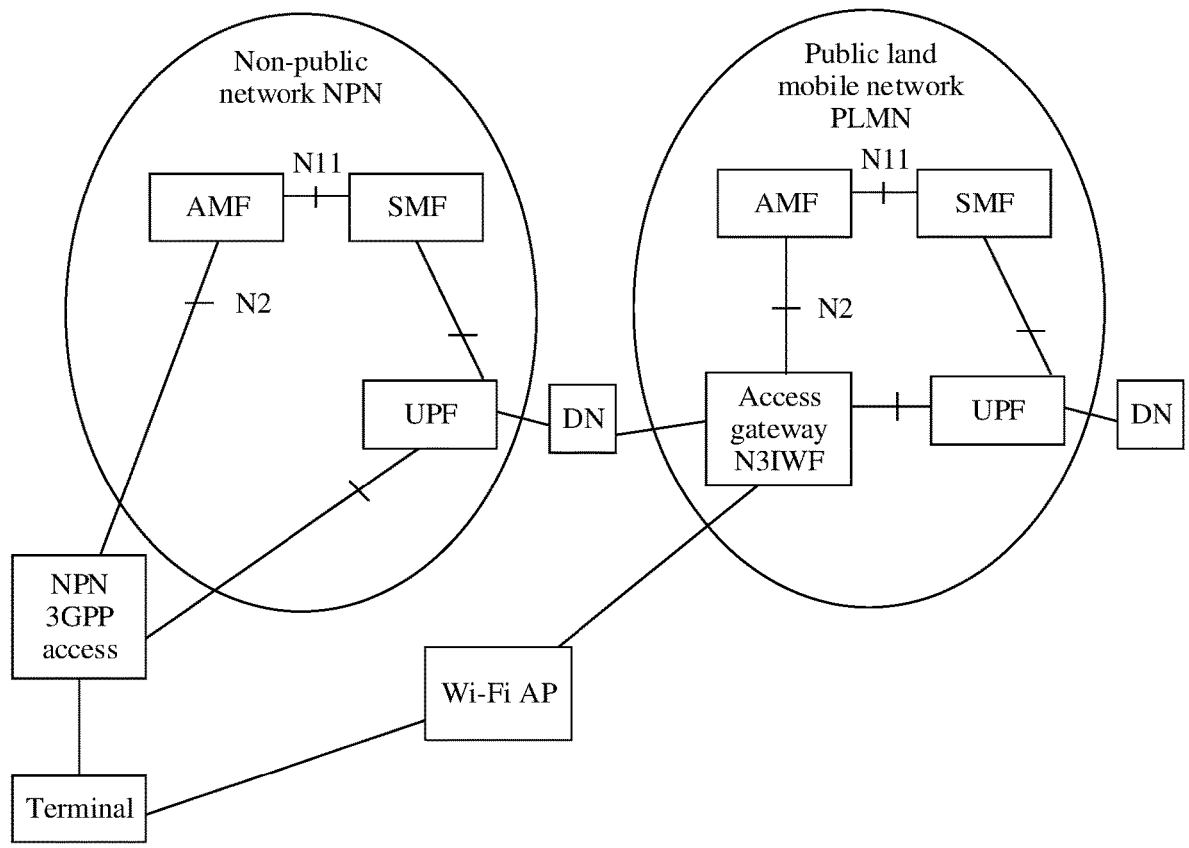
FIG. 3C, FIG. 3D, and FIG. 4 each are example schematic diagrams of a plurality of links according to an embodiment of this application.
Figure 3D:
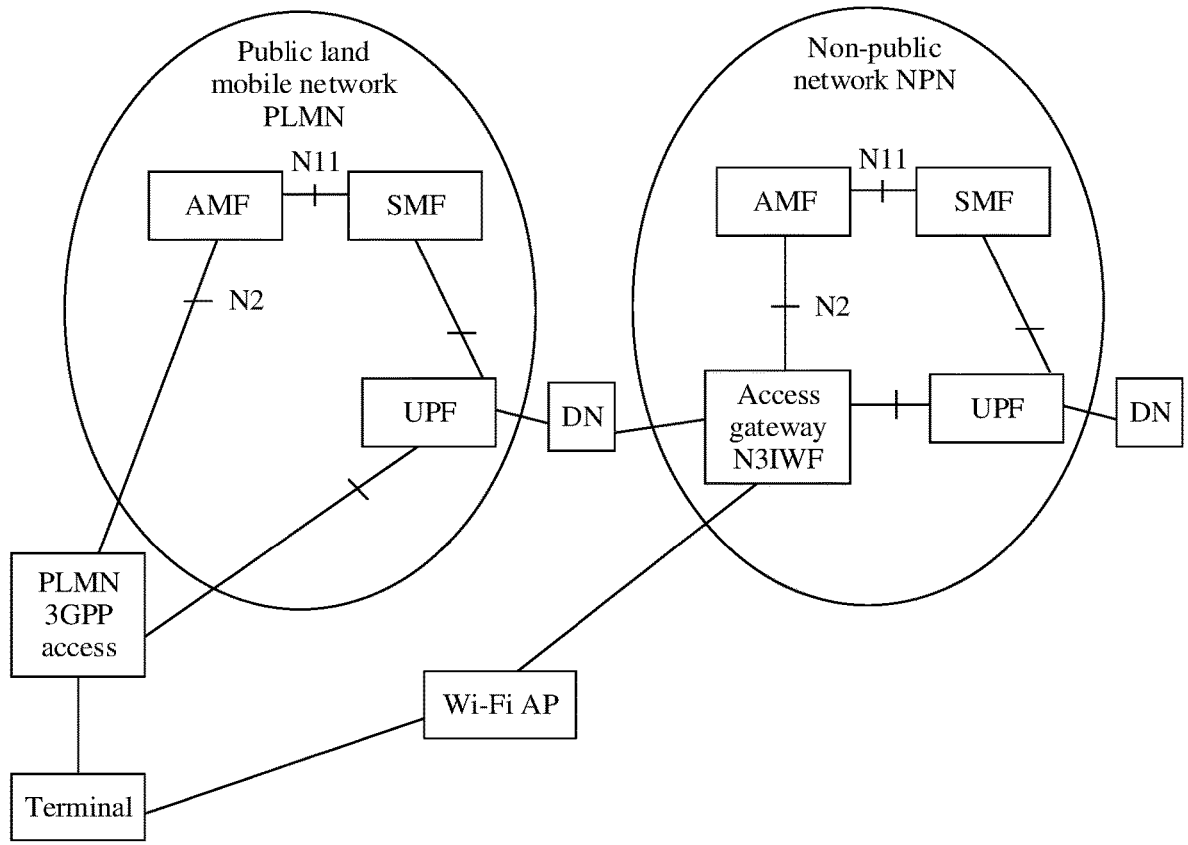
Figure 4:
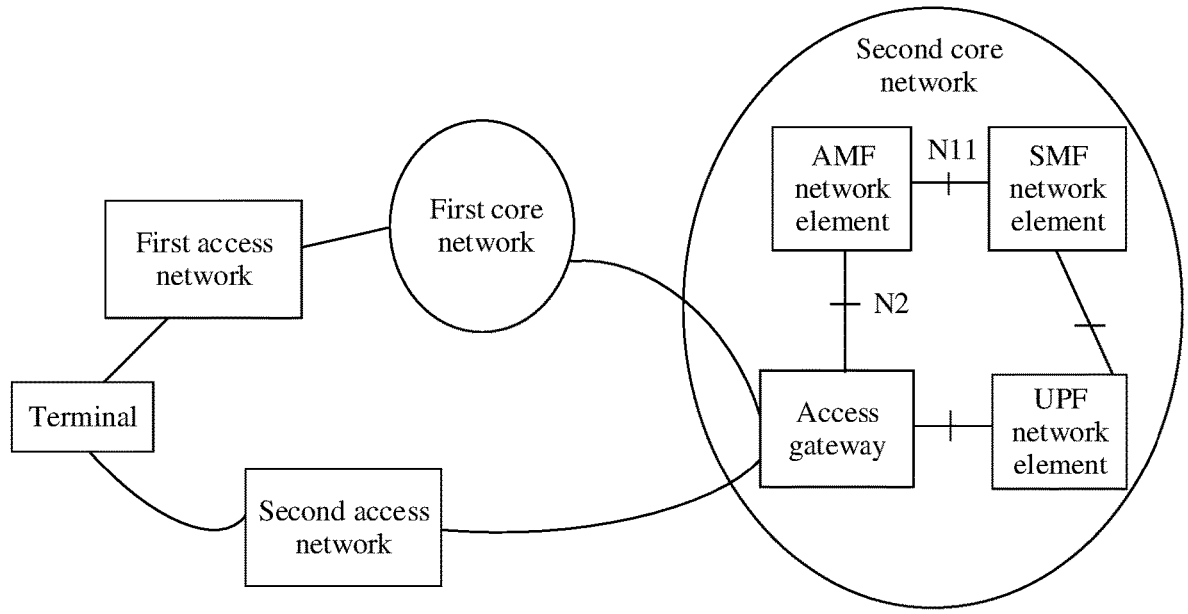

In view of this, this application provides a communication method. As shown in FIG. 4, two communication links are established between a terminal and a second core network. One communication link is for the terminal to access a first core network through a first access network and then access the second core network through the first core network, and the other communication link is for the terminal to access the second core network through a second access network. An establishment sequence of the two communication links is not limited. For example, based on FIG. 4 and the interaction architecture shown in FIG. 3A in which the UE accesses the PLMN through the NPN network, FIG. 3C is a schematic diagram of a plurality of links. One link is for a terminal to access an NPN network through a 3GPP access network and then access a PLMN network through the NPN network. Another link is for the terminal to access the PLMN network through a WLAN AP. The NPN network is defined as a CN 1, and the PLMN network is defined as a CN 2. Based on FIG. 4 and the architecture of interaction between the NPN and the PLMN in FIG. 3B, to be specific, the PLMN network is a CN 1 and the NPN network is a CN 2, FIG. 3D is a schematic diagram of a plurality of links.

The following describes a communication process in this application, that is, a process of establishing a plurality of communication links. It should be noted that "and/or" in this application describes an association relationship between associated objects and represents that three relationships may exist. For example, A and/or B may represent the following three cases: Only A exists, both A and B exist, and only B exists. The character "/" generally indicates an "or" relationship between the associated objects.

"A plurality of" in this application means two or more.

In the descriptions of this application, terms such as "first" and "second" are used only for distinction and description, but cannot be understood as indicating or implying relative importance, or as indicating or implying a sequence.

In addition, the word "example" in embodiments of this application is used to represent giving an example, an illustration, or a description. Any embodiment or implementation solution described as an "example" in this application should not be explained as having more advantages than another embodiment or implementation solution. Exactly, the word "example" is used to present a concept in a specific manner.

Figure 5A:
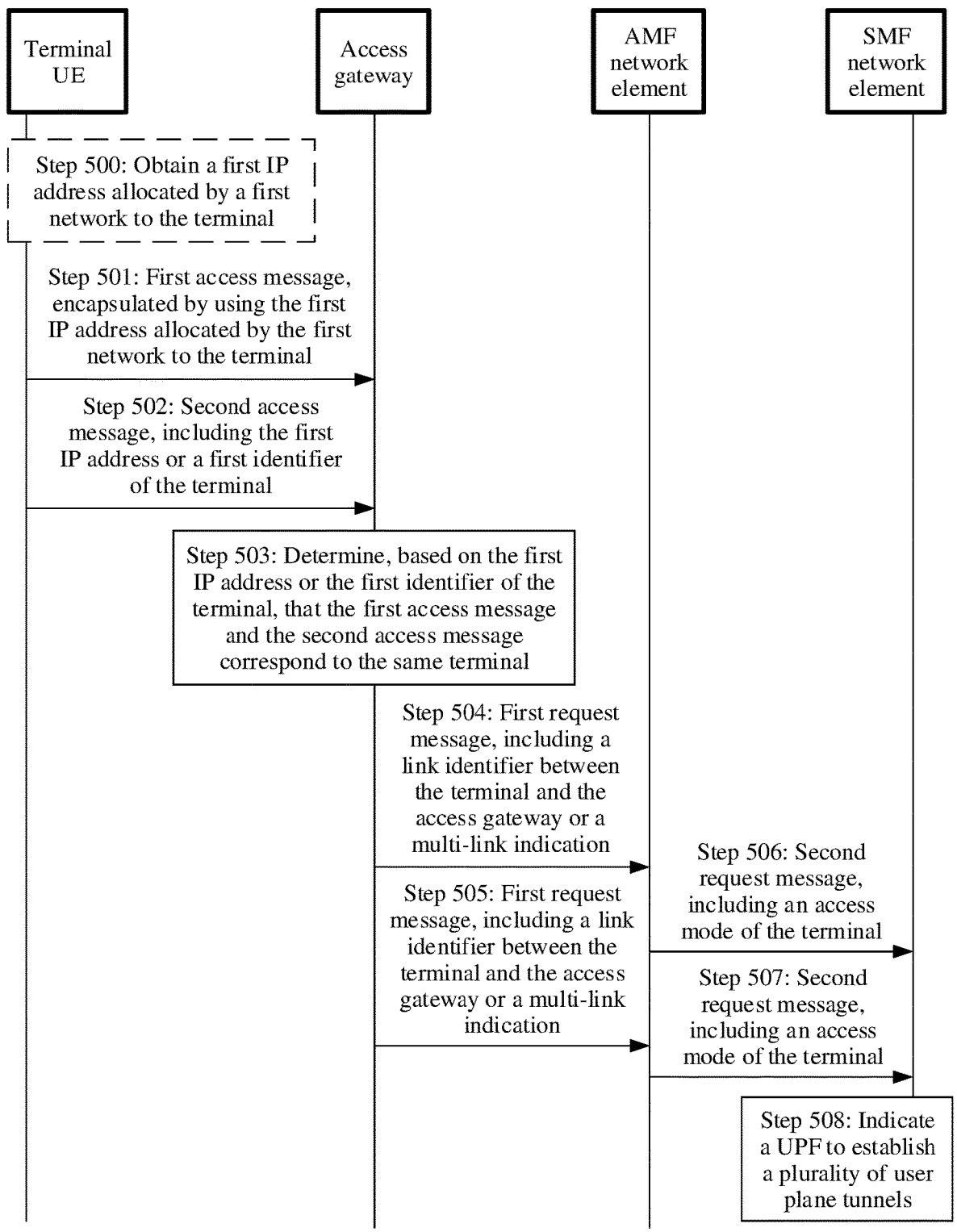

FIG. 5*a* is a schematic diagram of a process of establishing communication links.

With reference to FIG. 4, in an example, in FIG. 5*a*, a first network includes a first access network and a first core network, and a second network is a second access network. In another example, in FIG. 5*a*, the first network is the second access network, and the second network includes the first access network and the first core network.

The second access network is, for example, a Wi-Fi AP network or a wired access network, and the first access network is, for example, a cellular network such as a 4G cellular network or a 5G cellular network.

The first core network may be an NPN network or a PLMN network, and a second core network may be a PLMN network or an NPN network. Network identifiers of the first core network and the second core network may be the same or different. For example, an NPN network identifier is a network identifier (NID), and a PLMN network identifier is a PLMN ID.

An access gateway may be, for example, a non-3GPP interworking function (N3IWF) gateway, a next generation access gateway (ngPDG), a wireline access gateway (W-AGF), or a trusted access gateway (TNGF).

In addition, it should be noted that, an IP address allocated by the first network to a terminal is referred to as a first IP address below. An IP address allocated by the second network to the terminal is referred to as a second IP address. Specifically, when the first network includes the first access network and the first core network, and the second network is the second access network, the first IP address may be allocated by the first core network, and the second IP address is allocated by the second access network. When the first network is the second access network, and the second network includes the first access network and the first core network, the first IP address may be allocated by the second access network, and the second IP address is allocated by the first core network.

User location information obtained when the terminal accesses the first network is referred to as first user location information, and user location information obtained when the terminal accesses the second network is referred to as second user location information. Specifically, when the first network includes the first access network and the first core network, and the second network is the second access network, the first user location information is user location information obtained when the terminal accesses the first access network, and the second user location information is user location information obtained when the terminal accesses the second access network. When the first network is the second access network, and the second network includes the first access network and the first core network, the first user location information is user location information obtained when the terminal accesses the second access network, and the second user location information is user location information obtained when the terminal accesses the first access network.

When the first network includes the first access network and the first core network, and the second network is the second access network, an identifier of the first network is an identifier of the first core network, and an identifier of the second network is an identifier of the second access network. When the first network is the second access network, and the second network includes the first access network and the first core network, the identifier of the first network is the identifier of the second access network, and the identifier of the second network is the identifier of the first core network. The identifier of the second access network may be at least one of an operator and a name of the second access network, for example, a Wi-Fi access point name. The Wi-Fi access point name is, for example, a service set identifier (SSID), a homogenous extended service set identifier (HESSID), or a basic service set identifier (BSSID). The identifier of the first core network includes at least one of a name of the first core network, an operator, a PLMN ID, or an NPN network identifier (NID).

In addition, an access technology of the terminal in this application includes a 3GPP access technology, a non-3GPP access technology, an LTE access technology, an NG-RAN access technology, a Wi-Fi access technology, a fixed network access technology, a wired access technology, or the like.

In the communication process, in a possible implementation, step 500 is first performed. To be specific, the terminal may obtain the first IP address allocated by the first network to the terminal. Then, the following step 501 is performed.

When the first network includes the first access network and the first core network, and the second network is the second access network, the terminal may first register with the first core network through the first access network, and then establish a protocol data unit (PDU) session on the first core network, to obtain the first IP address allocated by the first core network to the terminal. The first IP address is an IP address allocated by the first network to the terminal. The terminal may access the first access network by using a 3GPP access technology or a non-3GPP access technology. The 3GPP access technology is the LTE access technology, the NG-RAN access technology, or the like. The non-3GPP access technology is a WLAN access technology, the fixed network access technology, the wired access technology, or the like.

When the first network is the second access network, and the second network includes the first access network and the first core network, the first IP address is an IP address allocated by the second access network to the terminal when the terminal accesses the second access network. The terminal may access the second access network by using a 3GPP access technology or a non-3GPP access technology. An access technology used by the terminal to access the second access network may be the same as or different from an access technology used by the terminal to access the first access network.

The terminal may further obtain one or more of the following information: the first user location information obtained when the terminal accesses the first network.

In addition, when the first network includes the first access network and the first core network, and the second network is the second access network, the terminal may further obtain the identifier of the first core network. The identifier of the first core network includes at least one of the NPN network identifier NID or the PLMN network identifier PLMN ID.

Step 501: The terminal sends a first access message to the access gateway of the second core network through the first network. Correspondingly, the access gateway receives the first access message sent by the terminal through the first network. The first access message is encapsulated by using the first IP address, and the first IP address is an IP address allocated by the first network to the terminal.

The terminal may obtain an IP address of the access gateway of the second core network based on a current technology, and then send the first access message to the access gateway. The access gateway may be, for example, an N3IWF. When the terminal obtains an IP address of the N3IWF, the terminal may first obtain an N3IWF FQDN, and then obtain an N3IWF IP address corresponding to the N3IWF FQDN through DNS query. Alternatively, the IP address of the N3IWF is configured based on a local configuration of the terminal. Alternatively, policy information obtained by the terminal from a network side includes the IP address of the N3IWF. The access gateway may alternatively be, for example, a W-AGF or a TNGF. Manners of obtaining IP addresses of the W-AGF and the TNGF may be the same as a manner of obtaining the IP address of the N3IWF.

After obtaining the IP address of the access gateway, the terminal establishes a connection to the access gateway, and initiates a registration procedure with the second core network through the access gateway. Specifically, the terminal may send the first access message to the access gateway through the first network, where the first access message is encapsulated by using the first IP address allocated by the first network to the terminal. The first access message may be an IKEv2 message, for example, an IKE_AUTH message. The terminal may encapsulate the IKEv2 message by using the first IP address of the terminal as a source address of the terminal or a local IP address of the terminal, and send the IKEv2 message to the access gateway.

The first access message may further include at least one of the following: the first user location information obtained when the terminal accesses the first network, a first identifier of the terminal, a non-access stratum (NAS) message, or the identifier of the first network. The first identifier of the terminal may include, but is not limited to, a temporary identifier (e.g., a globally unique temporary identifier (GUTI)) allocated by the second core network to the terminal and/or a permanent identifier of the terminal. It should be noted that the temporary identifier allocated by the second core network to the terminal is a temporary identifier allocated by the second core network to the terminal when the terminal accesses the second core network through a previous network. A difference between the temporary identifier in this step and the temporary identifier allocated by the second core network to the terminal in step 502 lies in that the temporary identifier in step 502 is a temporary identifier allocated by the second core network to the terminal when the terminal accesses the second core network through the first network. The NAS message is, for example, a registration request message, a service request message, a PDU session establishment message, or a PDU session update request message. This is not limited in this application.

In addition, the NAS message and/or all the foregoing mentioned parameters such as the first user location information obtained when the terminal accesses the first network and/or the identifier of the first core network may be encapsulated into an EAP-5G parameter, and sent to the access gateway by using the IKEv2 message (that is, the first access message).

Further, after receiving the first access message, the access gateway may save information and a correspondence between the information that are included in the first access message, for example, save at least one of the following: the first user location information obtained when the terminal accesses the first network, the identifier of the first network, the first IP address allocated by the first network to the terminal, or the first identifier of the terminal, and a correspondence thereof.

Step 502: The terminal sends a second access message to the access gateway through the second network. Correspondingly, the access gateway receives the second access message sent by the terminal through the second network. The second access message is encapsulated by using the second IP address, and the second IP address is an IP address allocated by the second network to the terminal. The second access message includes at least one of the following: the first IP address allocated by the first network to the terminal, or the first identifier of the terminal.

The second access message may further include at least one of the following: the second user location information obtained when the terminal accesses the second network, an identifier of an AMF network element, a NAS message, or the identifier of the second network.

When the first network includes the first access network and the first core network, and the second network is the second access network, the first identifier of the terminal may be the temporary identifier allocated by the second core network to the terminal and/or the permanent identifier of the terminal. The temporary identifier allocated by the second core network to the terminal is a temporary identifier allocated by the second core network to the terminal when the terminal accesses the second core network through the first network. The temporary identifier is, for example, the globally unique temporary identity (GUTI). The temporary identifier allocated by the second core network to the terminal includes the identifier of the AMF network element.

The second access message may be an IKEv2 message. The second IP address may also be used as a source address of the terminal or a local IP address of the terminal to encapsulate the second access message.

The terminal establishes a connection to the second core network through the first network in step 501, and may obtain the temporary identifier GUTI of the terminal that is allocated by the second core network to the terminal. The temporary identifier allocated by the second core network to the terminal includes the identifier of the AMF network element that serves the terminal in the second core network. If the terminal accesses the same core network as that in step 501 through the second network, that is, accesses the second core network, the terminal may select the same access gateway as that in step 501. The terminal may send, to the access gateway, the identifier of the AMF network element that serves the terminal in the second core network. In other words, the second access message may further include the identifier of the AMF network element in the second core network.

The NAS message is, for example, a registration request message, a service request message, a PDU session establishment message, or a PDU session update request message. This is not limited in this application.

In addition, the NAS message and/or all the foregoing mentioned parameters such as the second user location information obtained when the terminal accesses the second network may be encapsulated into an EAP-5G parameter, and sent to the access gateway by using the IKEv2 message (that is, the second access message).

Further, after receiving the second access message, the access gateway may save information and a correspondence between the information that are included in the second access message. For example, the access gateway saves at least one of the following: the first identifier of the terminal, the second user location information obtained when the terminal accesses the second network, the identifier of the AMF network element, the second IP address allocated by the second network to the terminal, or the first IP address allocated by the first network to the terminal, and a correspondence thereof. The correspondence in step 503 is different from the correspondence in step 502.

Step 503: The access gateway determines, based on the first IP address, that the first access message and the second access message correspond to the same terminal.

The access gateway may determine, based on the first IP address and/or the first identifier of the terminal that are/is carried in the first access message and the first IP address and/or the first identifier of the terminal that are/is included in the second access message, whether the first access message and the second access message are from the same terminal. If the two messages include the same first IP address, the two messages are from the same terminal. Alternatively, if the two messages include the same first identifier of the terminal, the two messages are from the same terminal.

If a terminal sends two access messages to the access gateway, the access gateway may establish two communication connections to an AMF network element for the terminal. For example, in step 504 and step 505, the access gateway sends two first request messages to the AMF network element. For ease of description herein, a request message sent by the access gateway to the AMF network element is defined as a first request message. It should be noted that the access gateway establishes only one N2 connection to the AMF network element, and sends the two first request messages to the AMF network element on the N2 connection.

Step 504: After receiving the first access message sent by the terminal through the first network, the access gateway may send a first request message to the AMF network element. Correspondingly, the AMF receives the first request message sent by the access gateway. The first request message includes at least one of a link identifier of a link between the terminal and the access gateway and a multi-link indication, or the multi-link indication is for indicating that a plurality of links exist between the terminal and the access gateway.

The link identifier carried in the first request message in step 504 may be for identifying that the terminal accesses the second core network through the first network. The link identifier may be, for example, the first IP address, where the first IP address is for indicating a link established between the terminal and the access gateway through the first network, or may be a link identifier allocated by the access gateway to a link through which the terminal is connected to the access gateway through the first network.

The first request message sent by the access gateway to the AMF network element may further include one or more of the following: the first user location information obtained when the terminal accesses the first network, the NAS message, the identifier of the first network, the first identifier of the terminal, and the first IP address allocated by the first network to the terminal. The information is from the first access message sent by the terminal. The first user location information and/or the identifier of the first network may be carried in an additional user location parameter.

In addition, the first request message may further include an access mode of the terminal. If the first network includes the first access network and the first core network, herein, the access mode of the terminal indicates that the terminal accesses the second core network through the first core network, and/or indicates the access technology used by the terminal to access the first access network. In a possible implementation, the access gateway may identify, based on a local configuration, that the terminal accesses the access gateway through the first core network. Alternatively, the access gateway may identify, based on the first IP address, that the terminal accesses the access gateway through the first core network. For example, when determining that the first IP address of the terminal is allocated by the first core network to the terminal, the access gateway determines that the terminal accesses the access gateway through the first core network. If the first network includes the second access network, herein, the access mode of the terminal indicates the access technology used by the terminal to access the second access network. For example, the access technology is a 3GPP access technology or a non-3GPP access technology.

The AMF network element may further process the NAS message from the terminal, and complete a related procedure based on the NAS message, for example, complete the registration procedure of the terminal with the second core network, a service request procedure, or a session establishment or update procedure.

Further, the AMF network element may save information in the first request message in step 504, and save a correspondence between the information.

Step 505: After receiving the second access message sent by the terminal through the second network, the access gateway may send the other first request message to the AMF network element in step 504. Correspondingly, the AMF receives the first request message sent by the access gateway. The first request message includes at least one of a link identifier of a link between the terminal and the access gateway and a multi-link indication, or the multi-link indication is for indicating that a plurality of links exist between the terminal and the access gateway.

The link identifier carried in the first request message in step 505 may be for identifying that the terminal accesses the second core network through the second network. The link identifier may be, for example, the second IP address, where the second IP address is for indicating a link established between the terminal and the access gateway through the second network, or may be a link identifier allocated by the access gateway to a link through which the terminal is connected to the access gateway through the second network.

The first request message sent by the access gateway to the AMF network element may further include one or more of the following: the second user location information obtained when the terminal accesses the second network, the NAS message, the first identifier of the terminal, the second IP address allocated by the second network to the terminal, and the identifier of the second network. The information is from the second access message sent by the terminal. The second user location information may be carried in an additional user location parameter.

In addition, the first request message may further include an access mode of the terminal. Herein, the access mode of the terminal indicates the access technology used by the terminal to access the second access network. Alternatively, the access mode of the terminal indicates that the terminal accesses the second core network through the first core network, and/or indicates the access technology used by the terminal to access the first access network. For example, the access technology is a 3GPP access technology or a non-3GPP access technology.

The AMF network element may process the NAS message from the terminal, and complete a related procedure based on the NAS message, for example, complete a registration procedure of the terminal with the second core network, a service request procedure, or a session establishment or update procedure.

The AMF network element may save information in the first request message in step 505, and save a correspondence between the information. The correspondence is different from the correspondence between the information in the first request message in step 504.

Step 503 may be performed after step 504 and step 505, and a sequence of step 503, step 504, and step 505 is not limited.

A link used by the terminal to access the second core network through the first core network and a link used by the terminal to access the second core network through the second access network may be in an active state or an inactive state. A link in the active state has a data channel, and may transmit a service data packet for the terminal. A link in the inactive state does not have a data channel, and cannot transmit a service data packet for the terminal.

After receiving the two first request messages sent by the access gateway, the AMF network element may send two second request messages to an SMF network element, where the two second request messages may be sent through an N11 connection. For details, refer to step 506 and step 507.

Step 506: After receiving the first request message sent by the access gateway in step 504, the AMF network element may send a second request message to the SMF network element. Correspondingly, the SMF network element receives the second request message sent by the AMF network element. The second request message may include at least one of the following: a first indication indicating that a plurality of links exist between the terminal and the access gateway, the identifier of the first network, an access mode of the terminal, the NAS message, the first user location information obtained when the terminal accesses the first network, the first identifier of the terminal, or the first IP address allocated by the first network to the terminal.

The access mode of the terminal may be from the first request message sent by the access gateway to the AMF network element in step 504, or may be an access mode of the terminal that is determined by the AMF network element based on information about the access gateway. For a process, refer to the current technology. The first indication indicating that a plurality of links exist between the terminal and the access gateway may be the multi-link indication in the first request message sent by the access gateway to the AMF network element in step 504, or may be a first indication determined by the AMF network element based on the multi-link indication. All other information in the second request message is from the first request message sent by the access gateway to the AMF network element in step 504. If the NAS message is the registration request message, the AMF network element only needs to process the NAS message, and does not need to continue to forward the NAS message to the SMF network element. If the NAS message is the PDU session establishment request message, the AMF network element needs to continue to forward the NAS message to the SMF network element for processing.

In addition, the second request message may further include a first path identifier. The first path identifier may be the link identifier of the link between the terminal and the access gateway that is included in the first request message sent by the access gateway in step 504, or another link identifier allocated by the AMF network element for the link identifier of the link between the terminal and the access gateway in the first request message sent by the access gateway.

Step 507: After receiving the first request message sent by the access gateway in step 505, the AMF network element may send the other second request message to the SMF network element. Correspondingly, the SMF network element receives the second request message sent by the AMF network element. The second request message may include at least one of the following: a first indication indicating that a plurality of links exist between the terminal and the access gateway, the identifier of the second network, an access mode of the terminal, the NAS message, the second user location information obtained when the terminal accesses the second network, the first identifier of the terminal, or the second IP address allocated by the second network to the terminal.

The access mode of the terminal may be from the first request message sent by the access gateway to the AMF network element in step 505, or may be an access mode of the terminal that is determined by the AMF network element based on information about the access gateway. For a process, refer to the current technology. The first indication indicating that a plurality of links exist between the terminal and the access gateway may be the multi-link indication in the first request message sent by the access gateway to the AMF network element in step 505, or may be a first indication determined by the AMF network element based on the multi-link indication. All other information in the second request message is from the first request message sent by the access gateway to the AMF network element in step 505. If the NAS message is the registration request message, the AMF network element only needs to process the NAS message, and does not need to continue to forward the NAS message to the SMF network element. If the NAS message is the PDU session establishment request message, the AMF network element needs to continue to forward the NAS message to the SMF network element for processing.

In addition, the second request message may further include a second path identifier. The second path identifier may be the link identifier of the link between the terminal and the access gateway that is included in the first request message sent by the access gateway in step 505, or another link identifier allocated by the AMF network element for the link identifier of the link between the terminal and the access gateway in the first request message sent by the access gateway.

Step 508: The SMF network element establishes two user plane tunnels based on the first indication.

A specific process may include: The SMF network element indicates a UPF network element to allocate user plane resources, and sends response messages of the second request messages to the AMF network element, to establish the two user plane tunnels.

Figures 1, 5B:
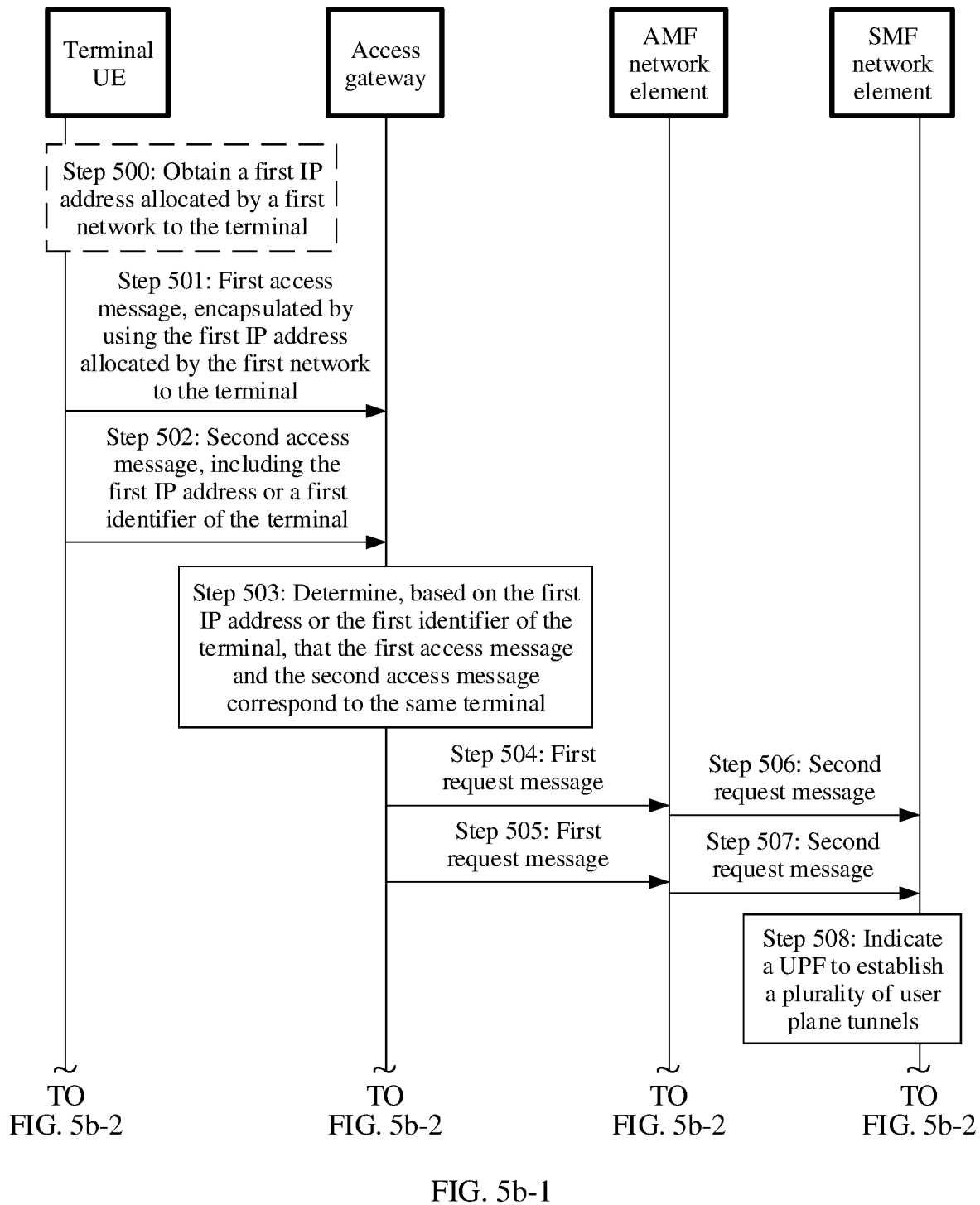
Figures 2, 5B:
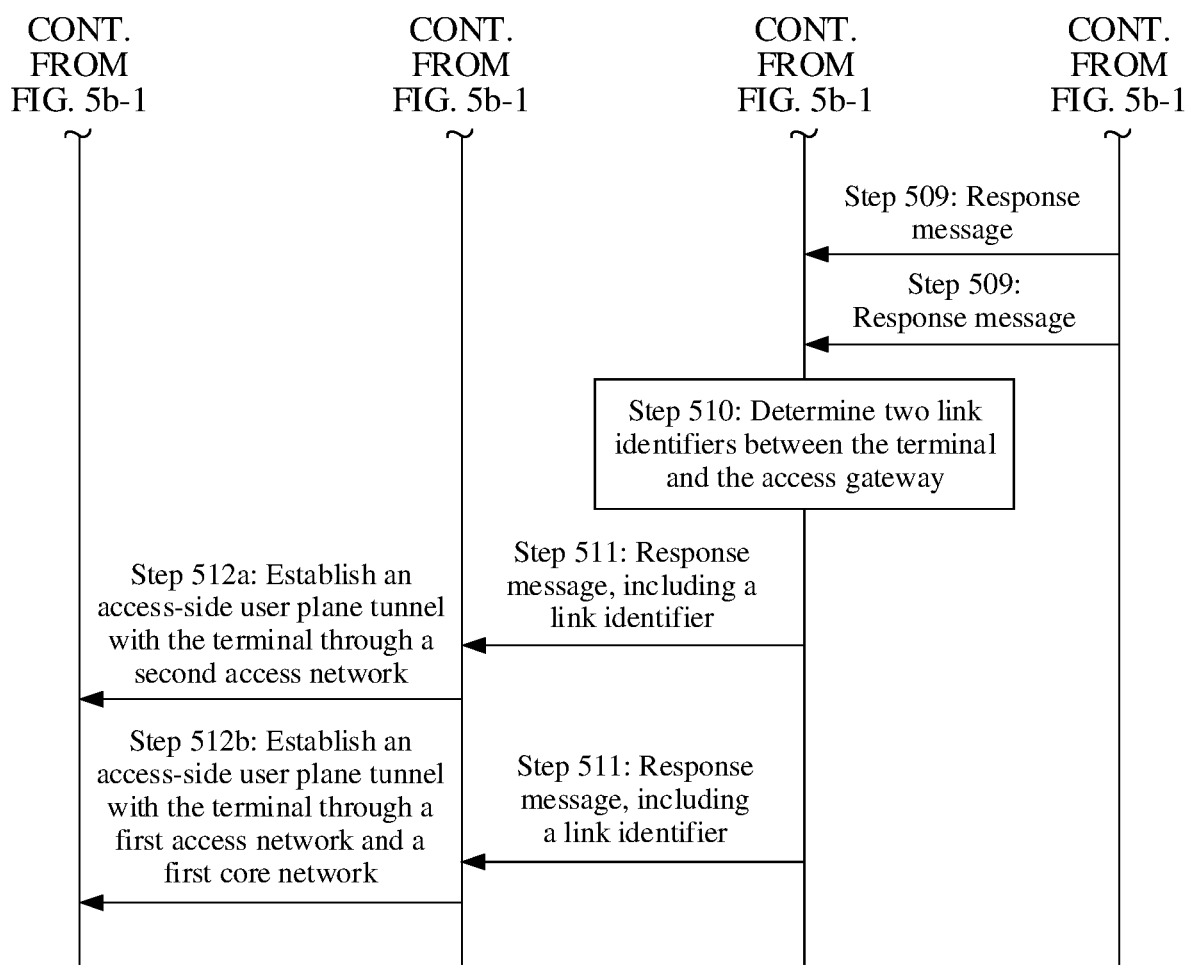

The foregoing describes in detail specific processes of establishing a plurality of links in two different cases of the first network and the second network. With reference to FIG. 5b-2, the following describes a detailed process after step 508. The process described below is applicable to the two different cases of the first network and the second network. In FIG. 5b-1, step 501 to step 508 are the same as step 501 to step 508 in FIG. 5a.

Step 509: The SMF network element sends the response messages of the second request messages to the AMF network element. Correspondingly, the SMF network element sends two response messages to the AMF network element.

A response message corresponding to the second request message in step 506 may include at least one of the following: the identifier of the first network, the access mode of the terminal, the first user location information obtained when the terminal accesses the first network, the first identifier of the terminal, the first IP address allocated by the first network to the terminal, or the first path identifier. All the information is from the second request message sent by the AMF network element to the SMF network element in step 506. The access mode of the terminal, the first path identifier, the identifier of the first network, and the like may indicate an identifier that is of a tunnel between the terminal and the access gateway and that corresponds to the user plane tunnel of the UPF network element. The response message of the second request message may further include a NAS reply message and N2 information. The NAS reply message is a reply message or a response message of the NAS message in the second request message in step 506, for example, a PDU session establishment success message or a PDU session update response message. The N2 information includes a UPF user plane tunnel identifier, a QoS parameter, a QoS flow identifier QFI, and the like.

A response message corresponding to the second request message in step 507 may include at least one of the following: the identifier of the second network, the access mode of the terminal, the second user location information obtained when the terminal accesses the second network, the first identifier of the terminal, the second IP address allocated by the second network to the terminal, or the second path identifier. All the information is from the second request message sent by the AMF network element to the SMF network element in step 507. The access mode of the terminal, the second path identifier, the identifier of the second network, and the like may indicate an identifier that is of a tunnel between the terminal and the access gateway and that corresponds to the user plane tunnel of the UPF network element. The response message of the second request message may further include a NAS reply message and N2 information. The NAS reply message is a reply message or a response message of the NAS message in the second request message in step 507, for example, a PDU session establishment success message or a PDU session update response message. The N2 information includes a UPF user plane tunnel identifier, a QoS parameter, a QoS flow identifier QFI, and the like.

Step 510: The AMF network element determines link identifiers of links between the terminal and the access gateway based on the access mode of the terminal.

When the second request messages sent by the AMF to the SMF network element include two access modes of the terminal, the two access modes of the terminal are from the two first request messages sent by the access gateway to the AMF network element. Each of the response messages that respectively correspond to the two second request messages and that are received by the AMF network element may include one access mode of the terminal. In this case, the AMF determines two link identifiers of links between the terminal and the access gateway based on the two different access modes of the terminal. One link identifier is for indicating that the terminal accesses the access gateway through the first core network, and the other link identifier is for indicating that the terminal accesses the access gateway through the second access network.

If the second request messages include only one access mode of the terminal, one response message of the second request message also includes the access mode of the terminal, and the other response message may include or not include the other access mode of the terminal. When the other response message does not include the other access mode, because only two links are established, the AMF network element may distinguish a path corresponding to the access mode of the terminal that is not included in the response message. The AMF network element may still determine two link identifiers of links between the terminal and the access gateway based on the two access modes of the terminal.

Step 511: The AMF network element sends response messages of the first request messages to the access gateway. Correspondingly, the access gateway receives the response messages of the first request messages that are sent by the AMF network element.

The response message of the first request message includes the link identifier, and the link identifier is for indicating a link that corresponds to the response message of the first request message and that is between the terminal and the access gateway.

The AMF network element sends two response messages of the first request messages to the access gateway. A link identifier included in one response message is for indicating that the terminal accesses the access gateway through the first core network, and a link identifier included in the other response message is for indicating that the terminal accesses the access gateway through the second access network. The AMF network element and the access gateway establish one N2 connection for the terminal. Therefore, the AMF network element sends the two response messages of the first request messages to the access gateway on the N2 connection.

For the response message of the second request message in step 506, the AMF network element may determine, based on the identifier of the first network, the first path identifier, or an access technology indication in the response message of the second request message, a link identifier carried in a response message of the first request message in step 504. The link identifier in the first request message is usually the same as the link identifier in the corresponding response message. The response message of the first request message may include the NAS reply message and at least one of the N2 information, the first path identifier, or the identifier of the first network.

For the response message of the second request message in step 507, the AMF network element may determine, based on the identifier of the second network, the second path identifier, or an access technology indication in the response message of the second request message, a link identifier carried in a response message of the first request message in step 505. The link identifier in the first request message is usually the same as the link identifier in the corresponding response message. The response message of the first request message may include the NAS reply message and at least one of the N2 information, the second path identifier, or the identifier of the second network.

The access gateway establishes user plane connections between the terminal and the access gateway based on the link identifiers. Details are as follows:

Step 512a: The access gateway establishes an access-side user plane tunnel with the terminal through the second access network.

Step 512b: The access gateway establishes an access-side user plane tunnel with the terminal through the first core network and the first access network.

For specific processes of step 512a and step 512b, refer to the current technology. For example, the access gateway sends an IKEv2 child SA establishment request message to the terminal, to establish an IPsec tunnel between the terminal and the access gateway. The access gateway establishes, based on the two link identifiers, a correspondence between the user plane tunnels between the access gateway and the UPF network element and the access-side links between the terminal and the access gateway. For example, the access gateway allocates different access gateway tunnel identifiers to the two access-side tunnels, and sends the access gateway tunnel identifiers to the UPF network element through the AMF network element and the SMF network element.

A plurality of user plane links are established between the terminal and the access gateway, and at least one of the plurality of links may be selected based on a steering policy to transmit a service flow. The steering policy is sent by the SMF to the terminal by using a NAS message. The steering policy includes a correspondence between flow description information (for example, an IP 5-tuple: source and destination IP addresses, source and destination port numbers, and a protocol type) and a link identifier. The link identifier is the identifier of the first network, the identifier of the second network, an access technology indication indicating the access technology used by the terminal to access the first access network, or an access technology indication indicating the access technology used by the terminal to access the second access network. The SMF network element may generate the steering policy based on the identifier of the first network, the identifier of the second network, the access technology indication indicating the access technology used by the terminal to access the first access network, or the access technology indication indicating the access technology used by the terminal to access the second access network, and send the steering policy to the terminal by using the NAS reply message. In other words, the SMF network element selects, based on the network identifier or the access technology, an appropriate link for transmitting the service flow. Alternatively, the SMF network element sends, to a PCF network element, the identifier of the first network, the identifier of the second network, the access technology indication indicating the access technology used by the terminal to access the first access network, or the access technology indication indicating the access technology used by the terminal to access the second access network. The PCF network element selects an appropriate link for the service flow based on the network identifier or the access technology, generates a steering rule, and sends the steering rule to the SMF network element. Then, the SMF generates the steering policy and sends the steering policy to the terminal by using the NAS reply message.

Figure 6A:
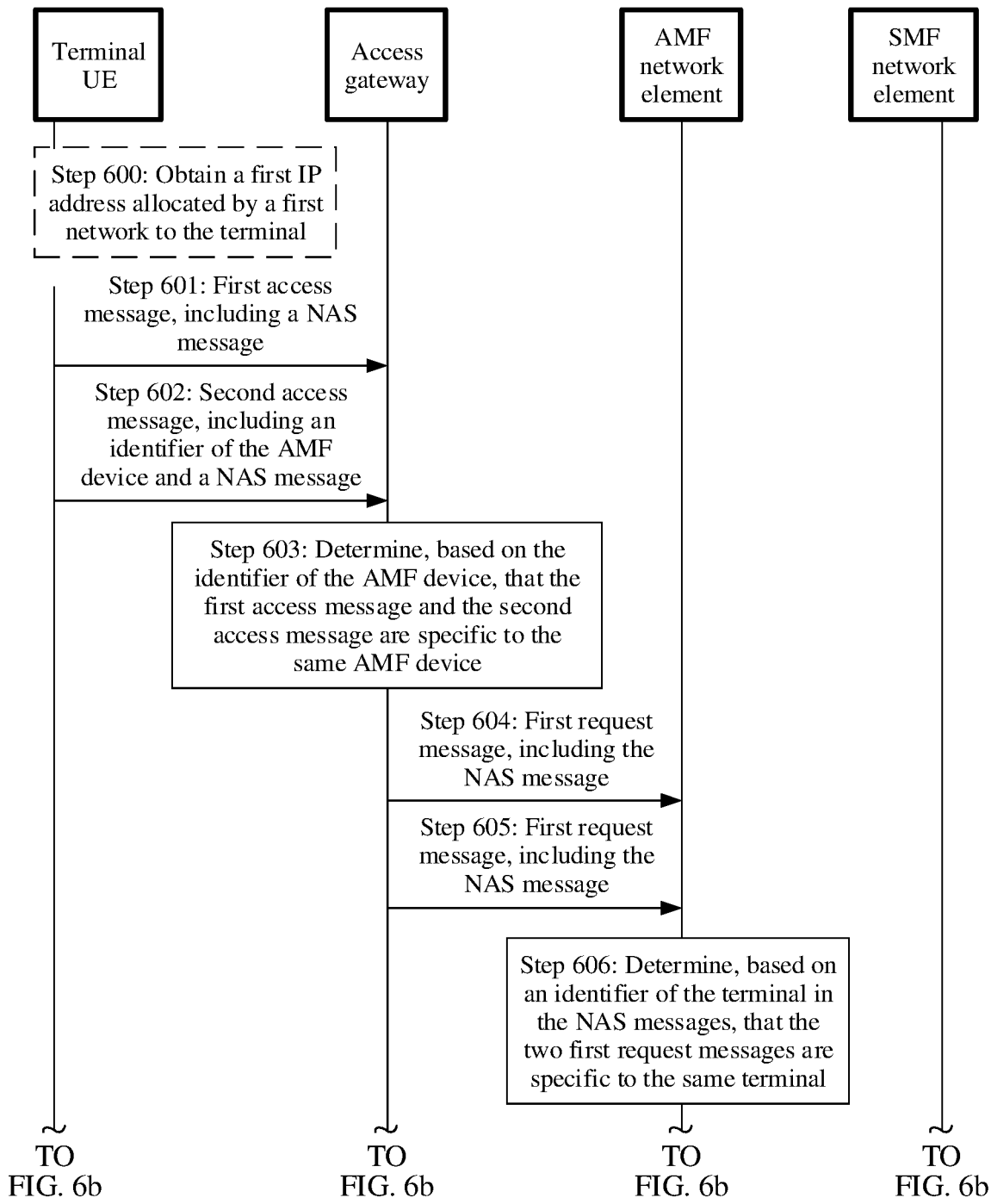
Figure 6B:
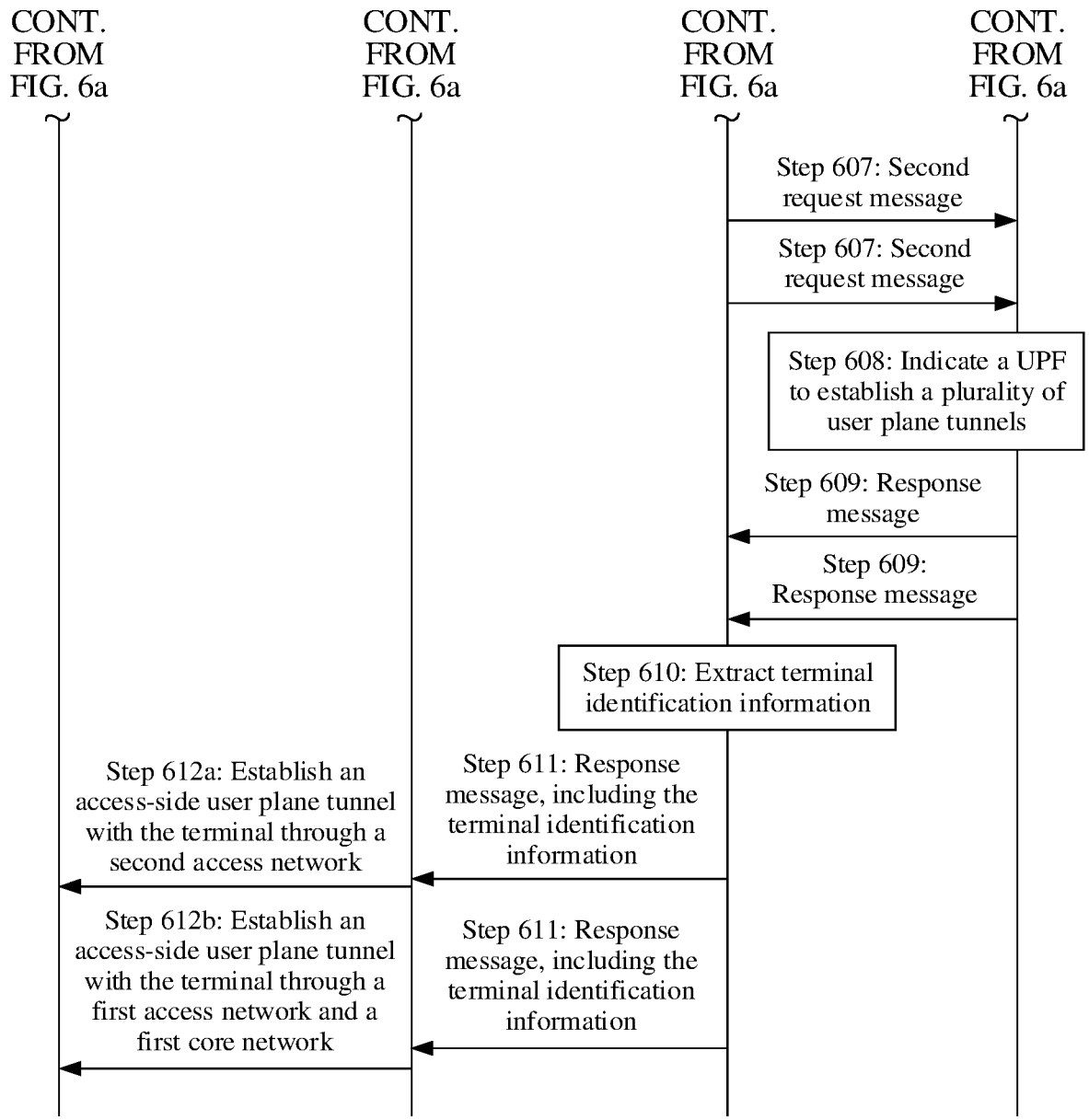

In the foregoing embodiment, the access gateway determines, based on the first IP address and/or the first identifier of the terminal, that the first access message and the second access message are from the same terminal. In other words, the access gateway determines that the terminal requests to establish two links. In descriptions of the following embodiment, an access gateway does not perform the process of determining that the terminal requests to establish two links in step 503. Instead, an AMF network element determines that a terminal requests to establish two links. For a specific process of this embodiment, refer to FIG. 6a and FIG. 6b.

Step 600 to step 602 are the same as step 500, step 501, and step 502. In step 601 and step 602, a first access message and a second access message each need to carry a NAS message and an identifier of the AMF network element. For other technical details, refer to the foregoing descriptions.

Step 603: After receiving the first access message and the second access message, the access gateway may select, based on the identifier that is sent by the terminal and that is of the AMF network element that servers the terminal in a second core network, the identifier of the AMF network element that serves the terminal in the second core network.

Step 604 and step 605: The access gateway separately sends first request messages to the AMF network element that serves the terminal in the second core network, that is, the access gateway sends two first request messages to the AMF network element. Different from the foregoing embodiment, the two first request messages are sent based on two different N2 connections between the access gateway and the AMF network element. The two first request messages each need to carry the NAS message. For other information, refer to the foregoing step 504 and step 505.

For the AMF network element, because the AMF network element receives the two first request messages based on the two N2 connections, the AMF network element cannot originally determine that the two first request messages are specific to the same terminal. In step 606, the AMF network element may determine, based on an identifier of terminal in NAS messages included in the two first request messages, that the two first request messages are sent for the same terminal. The AMF network element may associate the two N2 connections with a context of the same terminal. The AMF network element may further save information included in the first request messages respectively corresponding to the two N2 connections. The information included in the first request message may be the same as the information included in the first request message in the foregoing embodiment, or may be a part of the information in the foregoing embodiment.

The AMF network element may determine, based on the two N2 connections, that a plurality of links exist between the terminal and the access gateway, and may perform a process that is the same as step 506, step 507, and step 508 in the foregoing embodiment.

Step 607: After receiving the two first request messages from the access gateway, the AMF network element may send second request messages to an SMF network element. Correspondingly, the SMF network element receives the second request messages sent by the AMF network element. The second request message includes other parameter information mentioned in step 506 or step 507.

Step 608: The SMF network element establishes two user plane tunnels. Step 608 is the same as step 508.

Step 609: The SMF network element sends response messages of the second request messages to the AMF network element. Correspondingly, the AMF network element receives the response messages of the second request messages that are sent by the SMF network element. The response message of the second request message includes a first identifier of the terminal, and may further include other parameter information mentioned in step 509.

Step 610: After determining the context of the terminal based on the first identifier of the terminal, the AMF network element extracts terminal identification information from the context of the terminal.

Step 611: The AMF network element sends response messages of the first request messages to the access gateway. Correspondingly, the access gateway receives the response messages of the first request messages that are sent by the AMF network element. The response message includes the terminal identification information, and the terminal identification information may be extracted from the context of the terminal after the AMF network element determines the context of the terminal based on the first identifier of the terminal. In this case, the terminal identification information may also be referred to as an N2 terminal identifier. The N2 terminal identifier may be a terminal identifier used on an N2 interface. For example, the N2 terminal identifier may be a temporary identifier allocated by the AMF network element to the terminal on the N2 interface, for example, an N2 AMF UE ID; or may be a temporary identifier allocated by the access gateway to the terminal on the N2 interface, for example, an N2 N3IWF UE ID.

The response messages of the different first request messages carry the same terminal identification information, so that the access gateway may associate the response messages of the two different first request messages with the context of the same terminal based on the same terminal identification information. In other words, the response messages of the two first request messages are associated with the same terminal. For example, the response messages may be a first IP address allocated by a first network to the terminal and a second IP address allocated by a second network to the terminal.

Step 612a: The access gateway establishes an access-side user plane tunnel with the terminal through a second access network.

Step 612b: The access gateway establishes an access-side user plane tunnel with the terminal through a first core network and a first access network.

The access gateway knows that different N2 connections correspond to different connections between the terminal and the access gateway. The access gateway distinguishes between the connections between the terminal and the access gateway based on different IP addresses of the terminal (where one is an IP address allocated by the second access network to the terminal, and the other is an IP address allocated by the first core network to the terminal), and enables the connections to correspond to the different N2 connections. The access gateway initiates, based on an N2 message, a user plane tunnel establishment procedure between the access gateway and the corresponding terminal. The procedure is the same as that in a current technology. For example, the access gateway sends an IKEv2 child SA establishment request message to the terminal, to establish an IPsec tunnel between the terminal and the access gateway.

The foregoing describes the communication methods for establishing a plurality of links in embodiments of this application, and the following describes communication apparatuses in embodiments of this application. The method and the apparatus are based on a same technical concept. Because problem-resolving principles of the method and the apparatus are similar, for implementations of the apparatus and the method, refer to each other.

Figure 7:
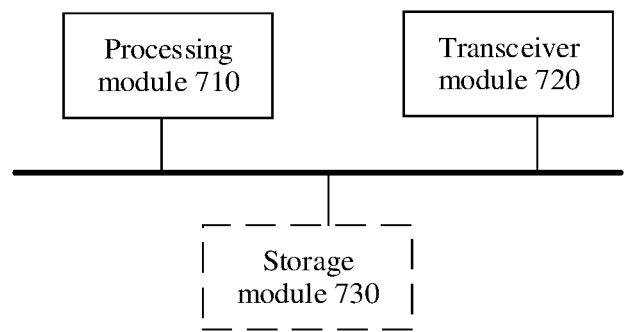
FIG. 7 and FIG. 8 show example communication apparatuses for establishing a plurality of links according to embodiments of this application.

Based on the same technical concept as the foregoing communication method, as shown in FIG. 7, a communication apparatus 700 is provided.

In an embodiment, the apparatus 700 can perform the steps performed by the terminal in the foregoing method embodiment. The apparatus 700 may be a terminal, or may be a chip used in the terminal. The apparatus 700 may include a transceiver module 720 and a processing module 710. In a possible implementation, the apparatus 700 further includes a storage module 730. The processing module 710 may be connected to the storage module 730 and the transceiver module 720, and the storage module 730 may also be connected to the transceiver module 720.

For example, the processing module 710 is configured to obtain a first IP address allocated by a first network to the apparatus; and the transceiver module 720 is configured to: send a first access message to an access gateway in a second core network through the first network, where the first access message is encapsulated by using the first IP address; and send a second access message to the access gateway through a second network, where the second access message includes at least one of the following: the first IP address or a first identifier of the apparatus, where the first network includes a first access network and a first core network, and the second network is a second access network; or the first network is a second access network, and the second network includes a first access network and a first core network.

For example, the first identifier of the apparatus includes at least one of the following: a temporary identifier allocated by the second core network to the apparatus, or a permanent identifier of the apparatus, where the temporary identifier allocated by the second core network to the apparatus is a temporary identifier allocated by the second core network to the apparatus when the apparatus accesses the second core network through the first network.

For example, the first access message includes an identifier of the first network, and/or the second access message further includes an identifier of the second network.

For example, the second access message further includes an identifier of an AMF network element in the second core network.

For example, the storage module 730 may be configured to store the first IP address, a second IP address, the identifier of the first network, the identifier of the second network, first user location information, second user location information, the first identifier of the terminal, and the identifier of the AMF network element.

In another embodiment, the apparatus 700 can perform the steps performed by the access gateway in the foregoing method embodiment. The apparatus 700 may be an access gateway, or may be a chip used in the access gateway. The apparatus 700 may include a transceiver module 720 and a processing module 710. In a possible implementation, the apparatus 700 further includes a storage module 730. The processing module 710 may be connected to the storage module 730 and the transceiver module 720, and the storage module 730 may also be connected to the transceiver module 720.

For example, the transceiver module 720 is configured to: receive a first access message sent by a terminal through a first network, where the first access message is encapsulated by using a first IP address allocated by the first network to the terminal; and receive a second access message sent by the terminal through a second network, where the second access message includes at least one of the following: the first IP address or a first identifier of the terminal, where the first network includes a first access network and a first core network, and the second network is a second access network; or the first network is a second access network, and the second network includes a first access network and a first core network.

For example, the processing module 710 is configured to determine, based on the first IP address and/or the first identifier of the terminal, that the first access message and the second access message correspond to the terminal.

For example, the first identifier of the terminal includes at least one of the following: a temporary identifier allocated by a second core network to the terminal, or a permanent identifier of the terminal, where the temporary identifier allocated by the second core network to the terminal is a temporary identifier allocated by the second core network to the terminal when the terminal accesses the second core network through the first network.

For example, the first access message includes an identifier of the first network, and/or the second access message further includes an identifier of the second network.

For example, the second access message further includes an identifier of an AMF network element in the second core network.

For example, the transceiver module 720 is further configured to send first request messages to the AMF network element, where the first request message includes at least one of the following: a link identifier of a link between the terminal and the apparatus and a multi-link indication, or the multi-link indication is for indicating that a plurality of links exist between the terminal and the apparatus.

For example, the link identifier of the link between the terminal and the apparatus is an IP address allocated by the first core network to the terminal or an IP address allocated by the second access network to the terminal.

For example, the first request message further includes at least one of the following: an access mode of the terminal, the identifier of the first network, or the identifier of the second network, where an access mode of the terminal indicates an access technology of the terminal, or indicates that the terminal accesses the apparatus through the first core network.

For example, the transceiver module 720 is further configured to receive response messages that are of the first request messages and that are sent by the AMF network element, where the response message of the first request message includes a link identifier, and the link identifier is for indicating a link that corresponds to the response message and that is between the terminal and the apparatus; and the processing module 710 is further configured to establish a user plane connection between the terminal and the apparatus based on the link identifier.

For example, the transceiver module 720 is further configured to receive response messages that are of the first request messages and that are sent by the AMF network element, where the response message includes terminal identification information; and the processing module 710 is further configured to associate the response messages of the first request messages with a context of the same terminal based on the terminal identification information.

For example, an access technology used by the terminal to access the first access network is a 3rd generation partnership project 3GPP access technology, and an access technology used by the terminal to access the second access network is a non-3GPP access technology; or an access technology used by the terminal to access the first access network is a non-3GPP access technology, and an access technology used by the terminal to access the second access network is a 3GPP access technology.

For example, the storage module 730 may be configured to store the first IP address, a second IP address, the identifier of the first network, the identifier of the second network, first user location information, second user location information, the first identifier of the terminal, and the identifier of the AMF network element.

In still another embodiment, the apparatus 700 can perform the steps performed by the AMF network element in the foregoing method embodiment. The apparatus 700 may be an AMF network element, or may be a chip used in the AMF network element. The apparatus 700 may include a transceiver module 720 and a processing module 710. In a possible implementation, the apparatus 700 further includes a storage module 730. The processing module 710 may be connected to the storage module 730 and the transceiver module 720, and the storage module 730 may also be connected to the transceiver module 720.

The transceiver module 720 may be configured to: send second request messages and response messages of first request messages; and receive response messages of the second request messages.

The storage module 730 may be configured to store a first IP address, a second IP address, an identifier of a first network, an identifier of a second network, first user location information, second user location information, a first identifier of a terminal, an identifier of the AMF network element, and an access mode of the terminal.

The processing module 710 may be configured to: after receiving the response message that is of the second request message and that is sent by an SMF network element, determine a link identifier of a link between the terminal and an access gateway based on the access mode of the terminal that is included in the response message of the second request message.

In yet another embodiment, the apparatus 700 can perform the steps performed by the SMF network element in the foregoing method embodiment. The apparatus 700 may be an SMF network element, or may be a chip used in the SMF network element. The apparatus 700 may include a transceiver module 720 and a processing module 710. In a possible implementation, the apparatus 700 further includes a storage module 730. The processing module 710 may be connected to the storage module 730 and the transceiver module 720, and the storage module 730 may also be connected to the transceiver module 720.

The transceiver module 720 may be configured to: receive second request messages; and send response messages of the second request messages.

The storage module 730 may be configured to store a first IP address, a second IP address, an identifier of a first network, an identifier of a second network, first user location information, second user location information, a first identifier of a terminal, an identifier of an AMF network element, a first path identifier, and a second path identifier.

The processing module 710 may be configured to indicate a UPF network element to establish a plurality of user plane tunnels.

The communication apparatus may be used in a communication device, a circuit, a hardware component, or a chip.

The processing module 710, the storage module 730, and the transceiver module 720 may be connected through a communication bus.

The storage module 730 may include one or more memories. The memory may be a component configured to store a program or data in one or more devices or circuits. The storage module 730 may store computer-executable instructions of methods on a terminal side, an access gateway side, an AMF network element side, and an SMF network element side, so that the processing module 710 performs the methods on the terminal side, the access gateway side, the AMF network element side, and the SMF network element side in the foregoing embodiments. The storage module 730 may be a register, a cache, a RAM, or the like. The storage module 730 may be integrated with the processing module 710. The storage module 730 may be a ROM or another type of static storage device that can store static information and instructions, and the storage module 730 may be independent of the processing module 710.

The transceiver module 720 may be an input/output interface, a pin, a circuit, or the like.

Figure 8:
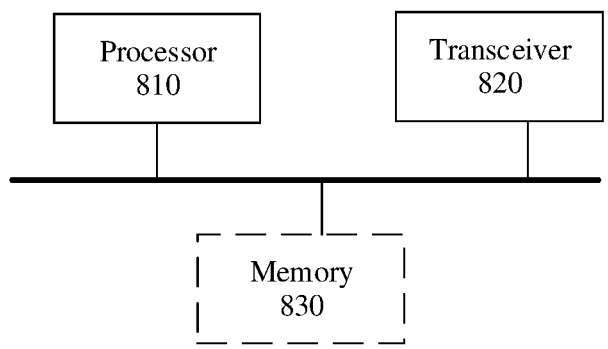

FIG. 8 is a schematic block diagram of a communication apparatus 800 according to an embodiment of this application. It should be understood that the apparatus 800 can perform the steps performed by the terminal, the access gateway, the AMF network element, or the SMF network element in the foregoing methods. The apparatus 800 includes a processor 810 and a transceiver 820, and in a possible implementation, further includes a memory 830. The processor 810 and the memory 830 are electrically coupled.

For example, the memory 830 is configured to store a computer program; the processor 810 may be configured to invoke the computer program or instructions stored in the memory, to perform the foregoing communication method through the transceiver 820.

In FIG. 7, the processing module 710 may be implemented by using the processor 810, the transceiver module 720 may be implemented by using the transceiver 820, and the storage module 730 may be implemented by using the memory 830.

The foregoing processor may be a central processing unit (CPU), a network processor (NP), or a combination of the CPU and the NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field programmable gate array (FPGA), a generic array logic (GAL) device and another programmable logic device, a discrete gate or a transistor logic device, a discrete hardware component, or any combination thereof. The general-purpose processor may be a microprocessor, or the processor may be any conventional processor or the like.

It should be further understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (Double Data Rate SDRAM, DDR SDRAM), an enhanced synchronous dynamic random access memory (ESDRAM), a synchlink dynamic random access memory (SLDRAM), and a direct rambus random access memory (DR RAM). It should be noted that the memory described in this application is intended to include but is not limited to these memories and any memory of another proper type.

An embodiment of this application further provides a computer storage medium that stores a computer program. When the computer program is executed by a computer, the computer may be enabled to perform the foregoing communication method.

An embodiment of this application further provides a computer program product including instructions. When the computer program product runs on a computer, the computer may be enabled to perform the foregoing provided communication method.

An embodiment of this application further provides a communication system. The system includes the access gateway, the AMF network element, and the SMF network element that perform the foregoing communication method.

An embodiment of this application provides a communication apparatus. The communication apparatus includes one or more modules, configured to implement the method in step 500 to step 512 or step 600 to step 612. The one or more modules may correspond to the steps in the method in step 500 to step 512 or step 600 to step 612. Specifically, in this embodiment of this application, for each step in the method performed by the terminal, the terminal includes a unit or a module that performs each step in the method. For each step in the method performed by the access gateway, the access gateway includes a unit or a module that performs each step in the method. For each step in the method performed by the AMF network element, the AMF network element includes a unit or a module that performs each step in the method. For each step in the method performed by the SMF network element, the SMF network element includes a unit or a module that performs each step in the method.

Figure 9:
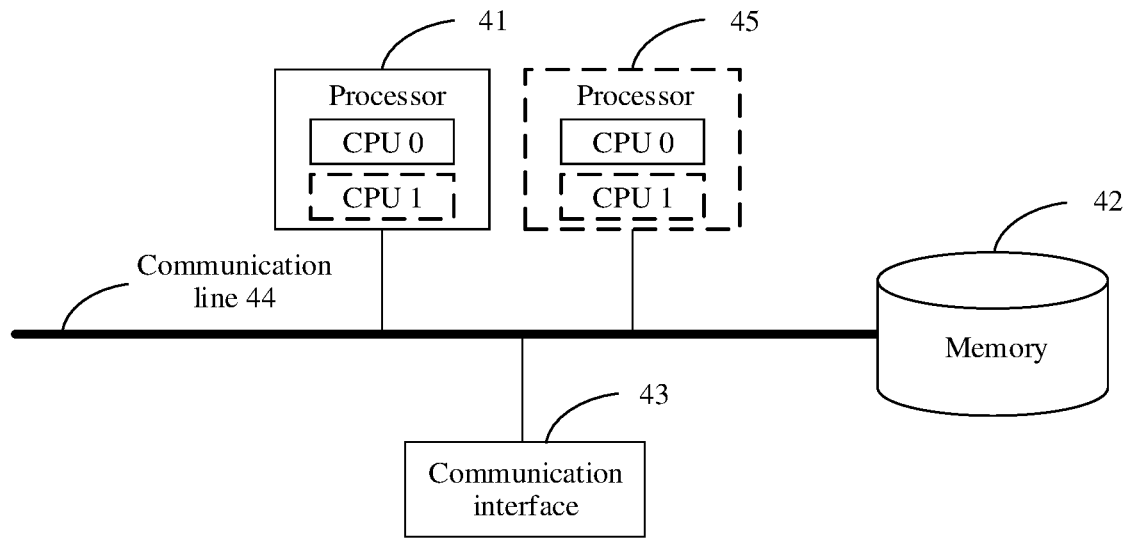
FIG. 9 is a diagram of an example hardware structure of a communication apparatus according to an embodiment of this application.

FIG. 9 is a schematic diagram of a hardware structure of a communication device according to an embodiment of this application. For a hardware structure of the access gateway, the AMF network element, or the SMF device in embodiments of this application, refer to the schematic diagram of the hardware structure of the communication device shown in FIG. 9. The communication device includes a processor 41, a communication line 44, and at least one communication interface (a communication interface 43 is used as an example in FIG. 9 for description).

The processor 41 may be a general-purpose central processing unit (CPU), a microprocessor, an application-specific integrated circuit (ASIC), or one or more integrated circuits configured to control program execution of the solutions of this application.

The communication line 44 may include a path for transferring information between the foregoing components.

The communication interface 43 is any apparatus such as a transceiver, and is configured to communicate with another device or a communication network such as the Ethernet, a radio access network (RAN), or a wireless local area network (WLAN).

Possibly, the communication device may further include a memory 42.

The memory 42 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer. However, the memory 42 is not limited thereto. The memory may exist independently, and is connected to the processor through the communication line 44. Alternatively, the memory may be integrated with the processor.

The memory 42 is configured to store computer-executable instructions for performing the solutions of this application, and the processor 41 controls execution of the computer-executable instructions. The processor 41 is configured to execute the computer-executable instructions stored in the memory 42, to implement the communication method provided in the foregoing embodiment of this application.

Possibly, the computer-executable instructions in this embodiment of this application may also be referred to as application program code. This is not specifically limited in this embodiment of this application.

During specific implementation, in an embodiment, the processor 41 may include one or more CPUs, for example, a CPU 0 and a CPU 1 in FIG. 9.

During specific implementation, in an embodiment, the communication device may include a plurality of processors, such as the processor 41 and a processor 45 in FIG. 9. Each of these processors may be a single-core (single-CPU) processor, or may be a multi-core (multi-CPU) processor. The processor herein may be one or more devices, circuits, and/or processing cores configured to process data (for example, computer program instructions).

For example, the communication apparatus in FIG. 9 is an AMF network element or a chip used in the AMF network element. The communication interface 43 is configured to support the communication apparatus in performing step 504, step 505, step 506, step 507, step 509, step 511, step 604, step 605, step 607, step 609, and step 611 in the foregoing embodiments. The processor 41 and/or the processor 45 are/is configured to support the communication apparatus in performing step 510, step 610, and the like in the foregoing embodiments.

In another example, the communication apparatus may be an access gateway, a chip used in the access gateway, or a chip system. The communication interface 43 is configured to support the communication apparatus in performing step 501, step 502, step 504, step 505, step 511, step 601, step 602, step 604, step 605, and step 611 in the foregoing embodiments. The processor 41 and/or the processor 45 are/is configured to support the communication apparatus in performing step 503 and step 603 in the foregoing embodiments.

In another example, the communication apparatus may be an SMF network element, a chip used in the SMF network element, or a chip system. The communication interface 43 is configured to support the communication apparatus in performing step 506, step 507, step 509, step 607, and step 609 in the foregoing embodiments. The processor 41 and/or the processor 45 are/is configured to support the communication apparatus in performing step 508 and step 608 in the foregoing embodiments.

Figure 10:
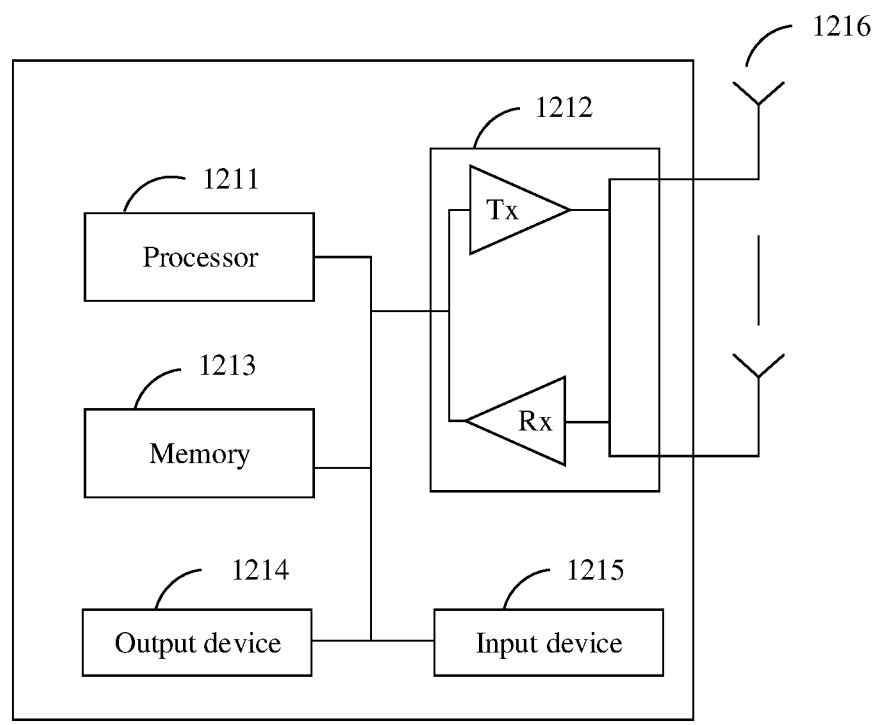
FIG. 10 is an example schematic diagram of a structure of a terminal according to an embodiment of this application.

FIG. 10 is a schematic diagram of a structure of a terminal according to an embodiment of this application.

The terminal includes at least one processor 1211 and at least one transceiver 1212. In a possible example, the terminal may further include at least one memory 1213, an output device 1214, an input device 1215, and one or more antennas 1216. The processor 1211, the memory 1213, and the transceiver 1212 are connected to each other. The antenna 1216 is connected to the transceiver 1212, and the output device 1214 and the input device 1215 are connected to the processor 1211.

A memory in embodiments of this application, for example, the memory 1213, may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction form or a data structure form and that can be accessed by a computer. However, the memory is not limited thereto.

The memory 1213 may exist independently, and is connected to the processor 1211. In another example, the memory 1213 may be integrated with the processor 1211, for example, be integrated into a chip. The memory 1213 can store program code for performing the technical solutions in embodiments of this application, and the processor 1211 controls execution of the program code. Various types of executed computer program code may also be considered as drivers of the processor 1211. For example, the processor 1211 is configured to execute the computer program code stored in the memory 1213, to implement the technical solutions in embodiments of this application.

The transceiver 1212 may be configured to support receiving or sending of a radio frequency signal between terminals or between a terminal and an access device, and the transceiver 1212 may be connected to the antenna 1216. The transceiver 1212 includes a transmitter Tx and a receiver Rx. Specifically, the one or more antennas 1216 may receive a radio frequency signal. The receiver Rx of the transceiver 1212 is configured to: receive the radio frequency signal from the antenna, convert the radio frequency signal into a digital baseband signal or a digital intermediate frequency signal, and provide the digital baseband signal or the digital intermediate frequency signal for the processor 1211, so that the processor 1211 further processes the digital baseband signal or the digital intermediate frequency signal, for example, performs demodulation processing and decoding processing. In addition, the transmitter Tx of the transceiver 1212 is further configured to: receive a modulated digital baseband signal or a modulated digital intermediate frequency signal from the processor 1211, convert the modulated digital baseband signal or the digital intermediate frequency signal into a radio frequency signal, and send the radio frequency signal through the one or more antennas 1216. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

The processor 1211 may be a baseband processor, or may be a CPU. The baseband processor and the CPU may be integrated or separated.

The processor 1211 may be configured to implement various functions for the terminal, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (LCD), a light emitting diode (LED) display device, a cathode ray tube (CRT) display device, a projector, or the like. The input device 1215 communicates with the processor 1211, and may receive an input of a user in a plurality of manners. For example, the input device 1215 may be a mouse, a keyboard, a touchscreen device, or a sensing device.

Specifically, the at least one processor 1211 is configured to perform step 500. The at least one transceiver 1212 is configured to perform step 501 and step 502.

Figure 11:
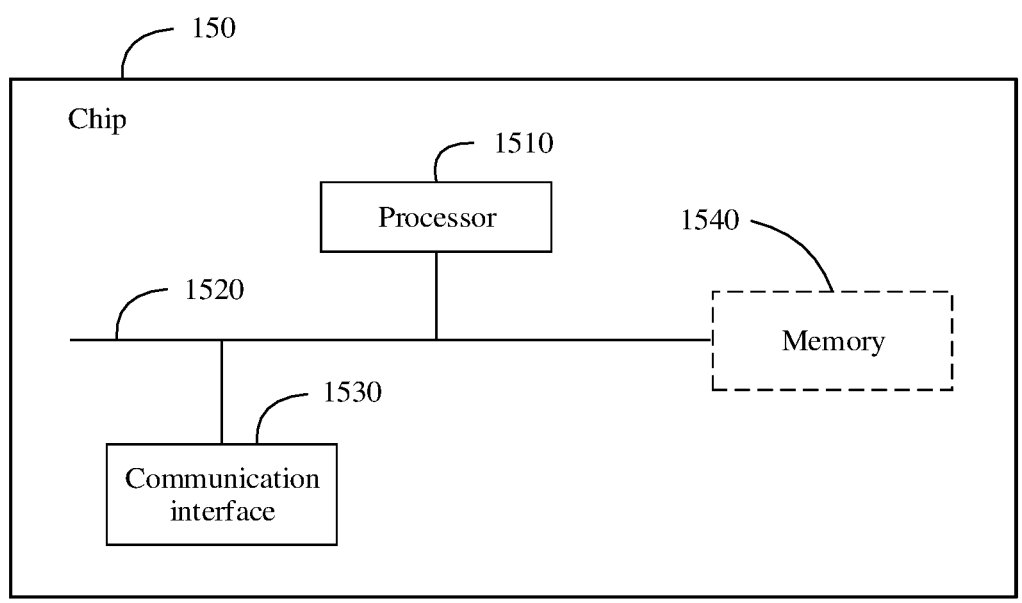
FIG. 11 is an example schematic diagram of a structure of a chip according to an embodiment of this application.

FIG. 11 is a schematic diagram of a structure of a chip 150 according to an embodiment of the present technology. The chip 150 includes one or more (including at least two) processors 1510 and a communication interface 1530.

In a possible implementation, the chip 150 further includes a memory 1540. The memory 1540 may include a read-only memory and a random access memory, and provide operation instructions and data for the processor 1510. A part of the memory 1540 may further include a nonvolatile random access memory (NVRAM).

In some implementations, the memory 1540 stores the following elements: an executable module or a data structure, or a subset thereof, or an extended set thereof.

In this embodiment of the present technology, a corresponding operation is performed by invoking the operation instruction stored in the memory 1540 (where the operation instruction may be stored in an operating system).

In a possible implementation, structures of chips used in a terminal, an access gateway, an AMF network element, and an SMF network element are similar, and different apparatuses may use different chips to implement respective functions.

The processor 1510 controls operations of the terminal, the access gateway, the AMF network element, and the SMF network element, and the processor 1510 may also be referred to as a central processing unit (CPU). The memory 1540 may include a read-only memory and a random access memory, and provide instructions and data for the processor 1510. A part of the memory 1540 may further include a non-volatile random access memory (NVRAM). For example, during application, the processor 1510, the communication interface 1530, and the memory 1540 are coupled together by using a bus system 1520. The bus system 1520 may further include a power bus, a control bus, a status signal bus, and the like in addition to a data bus. However, for clear description, various buses are marked as the bus system 1520 in FIG. 11.

The foregoing communication unit may be an interface circuit or a communication interface of the apparatus, and is configured to receive a signal from another apparatus. For example, when the apparatus is implemented as a chip, the communication unit is an interface circuit or a communication interface that is of the chip and that is configured to receive a signal from or send a signal to another chip or apparatus.

The methods disclosed in the foregoing embodiments of the present technology may be applied to the processor 1510, or implemented by the processor 1510. The processor 1510 may be an integrated circuit chip, and has a signal processing capability. In an implementation process, the steps in the foregoing methods may be implemented by using a hardware integrated logical circuit in the processor 1510, or by using instructions in a form of software. The processor 1510 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 1510 may implement or perform the methods, the steps, and the logical block diagrams that are disclosed in embodiments of the present technology. The general-purpose processor may be a microprocessor, or the processor may be any conventional processor or the like. The steps of the methods disclosed with reference to embodiments of the present technology may be directly performed and completed by a hardware decoding processor, or may be performed and completed by using a combination of hardware in the decoding processor and a software module. The software module may be located in a mature storage medium in the art, for example, a random access memory, a flash memory, a read-only memory, a programmable read-only memory, an electrically erasable programmable memory, or a register. The storage medium is located in the memory 1540, and the processor 1510 reads information in the memory 1540 and completes the steps of the foregoing methods in combination with hardware of the processor 1510.

In a possible implementation, the communication interface 1530 is configured to perform receiving and sending steps of the terminal, the access gateway, the AMF network element, and the SMF network element in the embodiments shown in FIG. 5*a*, FIG. 5*b*-1 and FIG. 5*b*-2, and FIG. 6*a* and FIG. 6*b*. The processor 1510 is configured to perform processing steps of the terminal, the access gateway, the AMF network element, and the SMF network element in the embodiments shown in FIG. 5*a*, FIG. 5*b*-1 and FIG. 5*b*-2, and FIG. 6*a* and FIG. 6*b*.

In the foregoing embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

An embodiment of this application further provides a computer-readable storage medium. The methods described in the foregoing embodiments may be completely or partially implemented by using software, hardware, firmware, or any combination thereof. If the methods are implemented in the software, functions used as one or more instructions or code may be stored in the computer-readable medium or transmitted on the computer-readable medium. The computer-readable medium may include a computer storage medium and a communication medium, and may further include any medium that can transfer a computer program from one place to another. The storage medium may be any target medium that can be accessed by a computer.

In an optional design, the computer-readable medium may include a RAM, a ROM, an EEPROM, a CD-ROM or another optical disc memory, a magnetic disk memory or another magnetic storage device, or any other medium that is used to carry or store required program code in an instruction form or a data structure form and that can be accessed by a computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disc (CD), a laser disc, an optical disc, a digital versatile disc (DVD), a floppy disk, and a Blu-ray disc. The magnetic disks usually magnetically reproduce data, and the optical discs optically reproduce data by using laser light. A combination of the foregoing media should also be included within a range of the computer-readable medium.

An embodiment of this application further provides a computer program product. The methods described in the foregoing embodiments may be completely or partially implemented by using software, hardware, firmware, or any combination thereof. If the methods are implemented in the software, the methods may be completely or partially implemented in a form of the computer program product. The computer program product includes one or more computer instructions. When the foregoing computer program instructions are loaded and executed on a computer, the procedures or functions described in the foregoing method embodiments are completely or partially generated. The computer may be a general-purpose computer, a dedicated computer, a computer network, a base station, a terminal, or another programmable apparatus.

Persons skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (e.g., system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some embodiments of this application have been described, persons skilled in the art can make changes and modifications to these embodiments once they learn the basic technical concept. Therefore, the appended claims are intended to be construed as to cover the embodiments and all changes and modifications falling within the scope of this application.

Persons skilled in the art can make various modifications and variations to embodiments of this application without departing from the spirit and scope of embodiments of this application. In this way, this application is intended to cover these modifications and variations to embodiments of this application provided that they fall within the scope of protection defined by the following claims and their equivalent technologies of this application.

What is claimed is:

1. A communication method, comprising:
   receiving, by an access gateway in a second core network, a first access message sent by a terminal through a first network, wherein
   the first access message is encapsulated by using a first IP address allocated by the first network to the terminal; and
   receiving, by the access gateway, a second access message sent by the terminal through a second network, wherein
   the second access message comprises at least one of:
   the first IP address, or
   a first identifier of the terminal, wherein
   the first network comprises a first access network and a first core network, and the second network is a second access network; or
   the first network is a second access network, and the second network comprises a first access network and a first core network.

2. The method according to claim 1, further comprising:
   determining, by the access gateway and based on the first IP address and/or the first identifier of the terminal, that the first access message and the second access message correspond to the terminal.

3. The method according to claim 1, wherein the first identifier of the terminal comprises at least one of:
   a temporary identifier allocated by the second core network to the terminal, or
   a permanent identifier of the terminal, wherein
   the temporary identifier is allocated by the second core network to the terminal when the terminal accesses the second core network through the first network.

4. The method according to claim 1, wherein the first access message comprises an identifier of the first network, and/or the second access message further comprises an identifier of the second network.

5. The method according to claim 1, wherein the second access message further comprises an identifier of an access and mobility management function (AMF) network element in the second core network.

6. The method according to claim 1, further comprising:
   sending, by the access gateway, first request messages to an access and mobility management function (AMF) network element, wherein the first request message comprises at least one of:
   a link identifier of a link between the terminal and the access gateway and a multi-link indication, or
   the multi-link indication indicates that a plurality of links exist between the terminal and the access gateway.

7. The method according to claim 6, wherein the link identifier of the link between the terminal and the access gateway is an IP address allocated by the first core network to the terminal or an IP address allocated by the second access network to the terminal.

8. The method according to claim 6, wherein the first request message further comprises at least one of:
   an access mode of the terminal, the identifier of the first network, or the identifier of the second network, wherein the access mode of the terminal indicates an access technology of the terminal, or indicates that the terminal accesses the access gateway through the first core network.

9. The method according to claim 6, further comprising:
receiving, by the access gateway, response messages of the first request messages and sent by the AMF network element, wherein
the response message of the first request message comprises a link identifier, and
the link identifier indicates a link corresponding to the response message, wherein the link is between the terminal and the access gateway; and
establishing, by the access gateway, a user plane connection between the terminal and the access gateway based on the link identifier.

10. The method according to claim 6, further comprising:
receiving, by the access gateway, response messages of the first request messages and sent by the AMF network element, wherein the response message comprises terminal identification information; and
associating, by the access gateway, the response messages of the first request messages with a context of a same terminal based on the terminal identification information.

11. The method according to claim 1, wherein the terminal uses a 3rd generation partnership project (3GPP) access technology to access the first access network, and the terminal uses a non-3GPP access technology to access the second access network; or
the terminal uses a non-3GPP access technology to access the first access network, and the terminal uses a 3GPP access technology to access the second access network.

12. A communication method, comprising:
obtaining, by a terminal, a first IP address allocated by a first network;
sending, by the terminal, a first access message to an access gateway in a second core network through the first network; and
sending, by the terminal, a second access message to the access gateway through a second network, wherein
the second access message comprises at least one of:
the first IP address, or
a first identifier of the terminal, wherein
the first network comprises a first access network and a first core network, and the second network is a second access network; or
the first network is a second access network, and the second network comprises a first access network and a first core network.

13. The method according to claim 12, wherein the first identifier of the terminal comprises at least one of:
a temporary identifier allocated by the second core network to the terminal, or
a permanent identifier of the terminal, wherein
the temporary identifier is allocated by the second core network to the terminal when the terminal accesses the second core network through the first network.

14. The method according to claim 12, wherein the first access message comprises an identifier of the first network, and/or the second access message further comprises an identifier of the second network.

15. The method according to claim 12, wherein the second access message further comprises an identifier of an access and mobility management function (AMF) network element in the second core network.

16. A communication apparatus, comprising:
a processor; and
a memory configured to store computer readable instructions that, when executed by the processor, cause the communication apparatus to:
receive a first access message sent by a terminal through a first network, wherein
the first access message is encapsulated by using a first IP address allocated by the first network to the terminal; and
receive a second access message sent by the terminal through a second network, wherein
the second access message comprises at least one of:
the first IP address, or
a first identifier of the terminal.

17. The apparatus according to claim 16, wherein the apparatus is further caused to determine, based on the first IP address and/or the first identifier of the terminal, that the first access message and the second access message correspond to the terminal.

18. The apparatus according to claim 16, wherein the first identifier of the terminal comprises at least one of:
a temporary identifier allocated by a second core network to the terminal, or
a permanent identifier of the terminal, wherein
the temporary identifier is allocated by the second core network to the terminal when the terminal accesses the second core network through the first network.

19. The apparatus according to claim 16, wherein the first access message comprises an identifier of the first network, and/or the second access message further comprises an identifier of the second network.

20. The apparatus according to claim 16, wherein the apparatus is further caused to send first request messages to an access and mobility management function (AMF) network element, wherein the first request message comprises at least one of: a link identifier of a link between the terminal and an access gateway and a multi-link indication, or the multi-link indication indicates that a plurality of links exist between the terminal and the access gateway.

* * * * *

UNITED STATES PATENT AND TRADEMARK OFFICE
CERTIFICATE OF CORRECTION

PATENT NO. : 12,207,324 B2
APPLICATION NO. : 17/896161
DATED : January 21, 2025
INVENTOR(S) : Youyang Yu et al.

Page 1 of 1

It is certified that error appears in the above-identified patent and that said Letters Patent is hereby corrected as shown below:

In the Specification

Column 10, Line 6, change "AR" to --AF--.

Column 14, Line 16, change "I" to --/--.

Signed and Sealed this
Eighth Day of April, 2025

Coke Morgan Stewart
*Acting Director of the United States Patent and Trademark Office*